(12) United States Patent
Das et al.

(10) Patent No.: US 11,767,866 B2
(45) Date of Patent: Sep. 26, 2023

(54) CONNECTORS

(71) Applicant: MATERIALISE N.V., Leuven (BE)

(72) Inventors: Brecht Das, Leuven (BE); Filip Dehing, Leuven (BE); Volodymyr Makarenko, Kyiv (UA); Ivan Rasko, Leuven (BE); Elias Rosseau, Leuven (BE); Irene Ruiz Diaz, Leuven (BE); Willem Verleysen, Leuven (BE); Philippe Schiettecatte, Leuven (BE)

(73) Assignee: MATERIALISE NV, Leuven (BE)

( * ) Notice: Subject to any disclaimer, the term of this patent is extended or adjusted under 35 U.S.C. 154(b) by 173 days.

(21) Appl. No.: 17/448,573

(22) Filed: Sep. 23, 2021

(65) Prior Publication Data

US 2022/0003256 A1 Jan. 6, 2022

Related U.S. Application Data

(63) Continuation of application No. PCT/US2020/024933, filed on Mar. 26, 2020.

(60) Provisional application No. 62/825,412, filed on Mar. 28, 2019.

(51) Int. Cl.
*F16B 7/04* (2006.01)
*F16B 11/00* (2006.01)

(52) U.S. Cl.
CPC .......... *F16B 7/0473* (2013.01); *F16B 11/008* (2013.01)

(58) Field of Classification Search
CPC .... F16B 7/0473; F16B 7/0413; F16B 7/0446; F16B 7/044; F16B 7/185; F16B 7/0406; F16B 11/006

See application file for complete search history.

(56) References Cited

U.S. PATENT DOCUMENTS

| | | | |
|---|---|---|---|
| 6,626,605 B1 | 9/2003 | Douglas et al. | |
| 2010/0192506 A1* | 8/2010 | Allred, III | F16B 11/008 403/205 |
| 2011/0194889 A1* | 8/2011 | Allred, III | F16B 11/008 403/170 |
| 2016/0016229 A1* | 1/2016 | Czinger | B62D 21/17 296/205 |
| 2016/0017909 A1* | 1/2016 | Erlacher | B62D 29/002 403/265 |
| 2018/0209460 A1 | 7/2018 | Lin | |

FOREIGN PATENT DOCUMENTS

| | | |
|---|---|---|
| EP | 2653065 A2 | 10/2013 |
| KR | 100572394 B1 | 4/2006 |
| WO | 84/02560 A1 | 7/1984 |
| WO | 2009/125559 A1 | 10/2009 |

* cited by examiner

*Primary Examiner* — Daniel J Wiley
(74) *Attorney, Agent, or Firm* — Dinsmore & Shohl LLP

(57) ABSTRACT

Embodiments of this application relate to connectors configured for coupling to a hollow structure, for joining hollow structures together, and/or for joining a hollow structure to a functional element. A connector may be configured to couple to one or more hollow structures, and may be further configured to couple to one or more functional elements. Exemplary connectors comprise a shell and a plug.

20 Claims, 19 Drawing Sheets

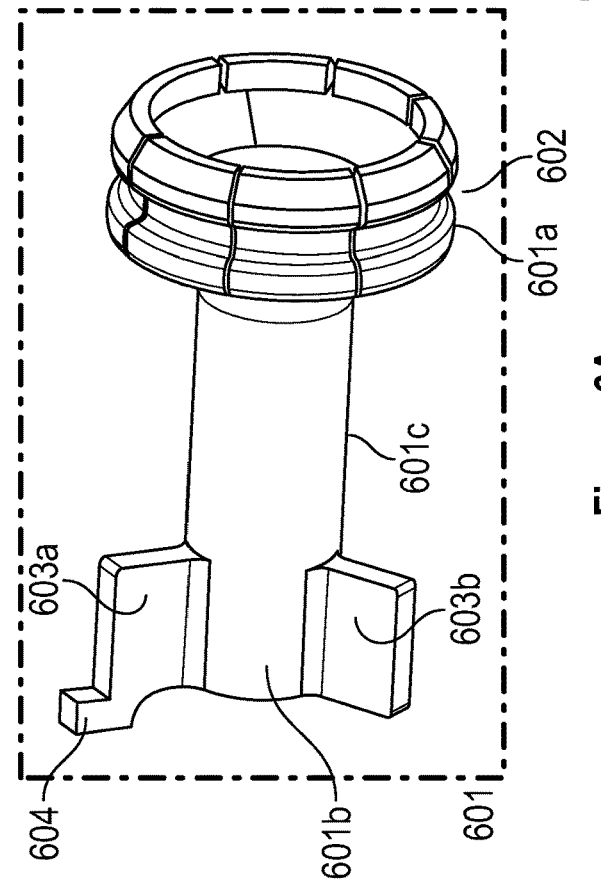
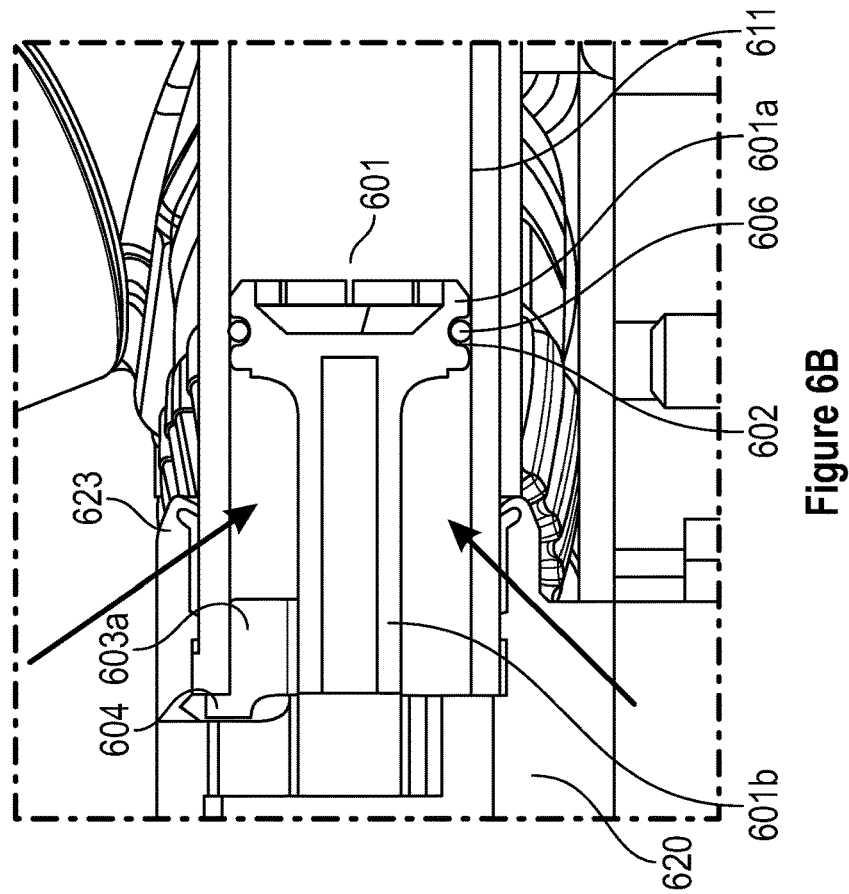
Figure 6A
Figure 6B

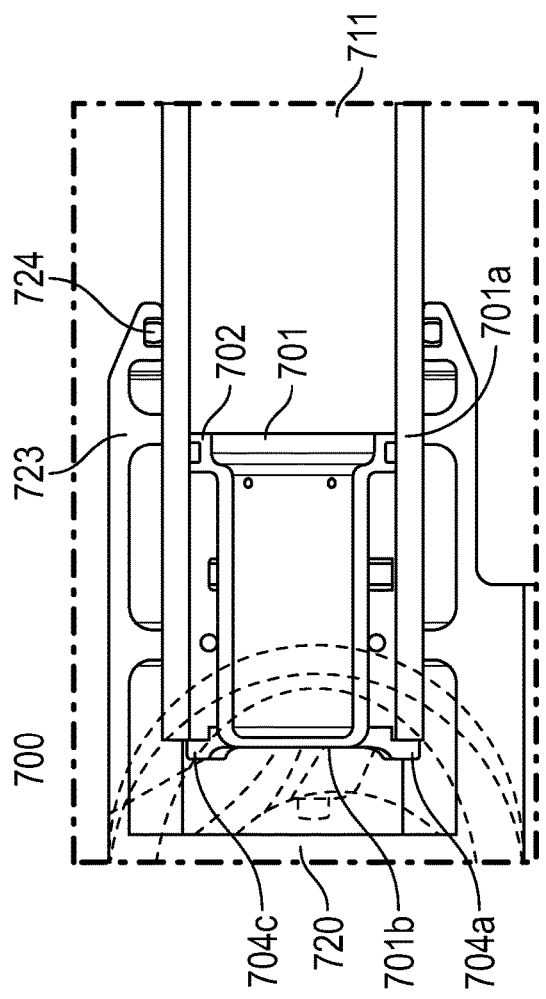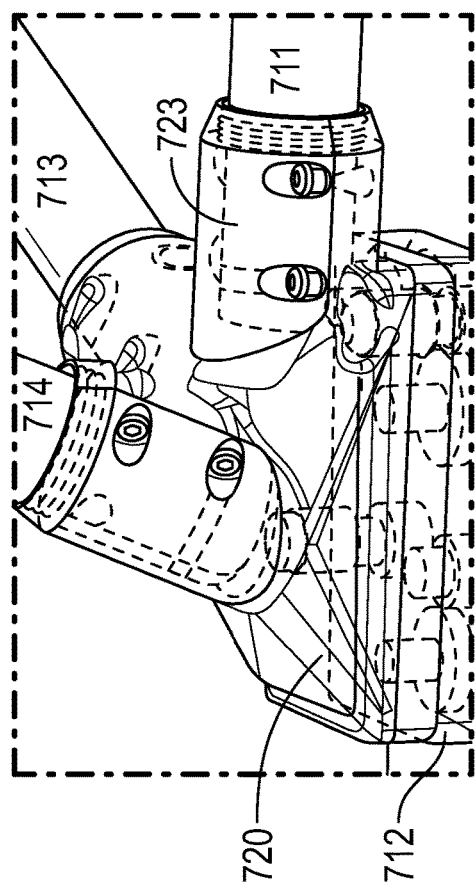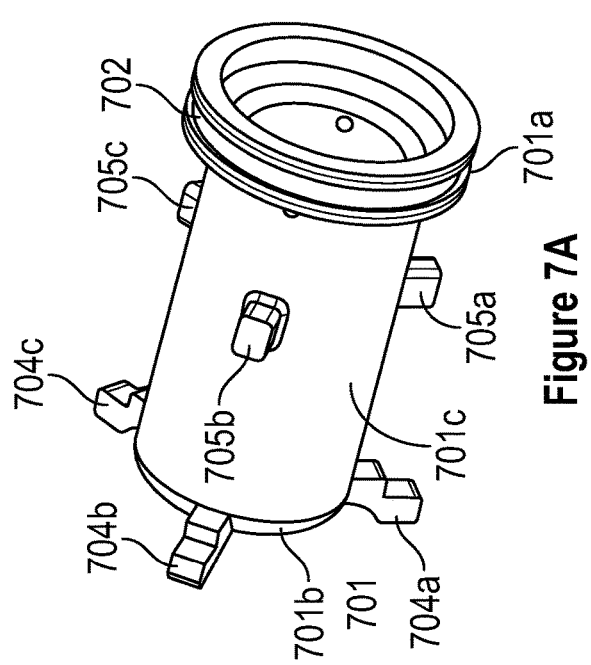
Figure 7B
Figure 7C
Figure 7A

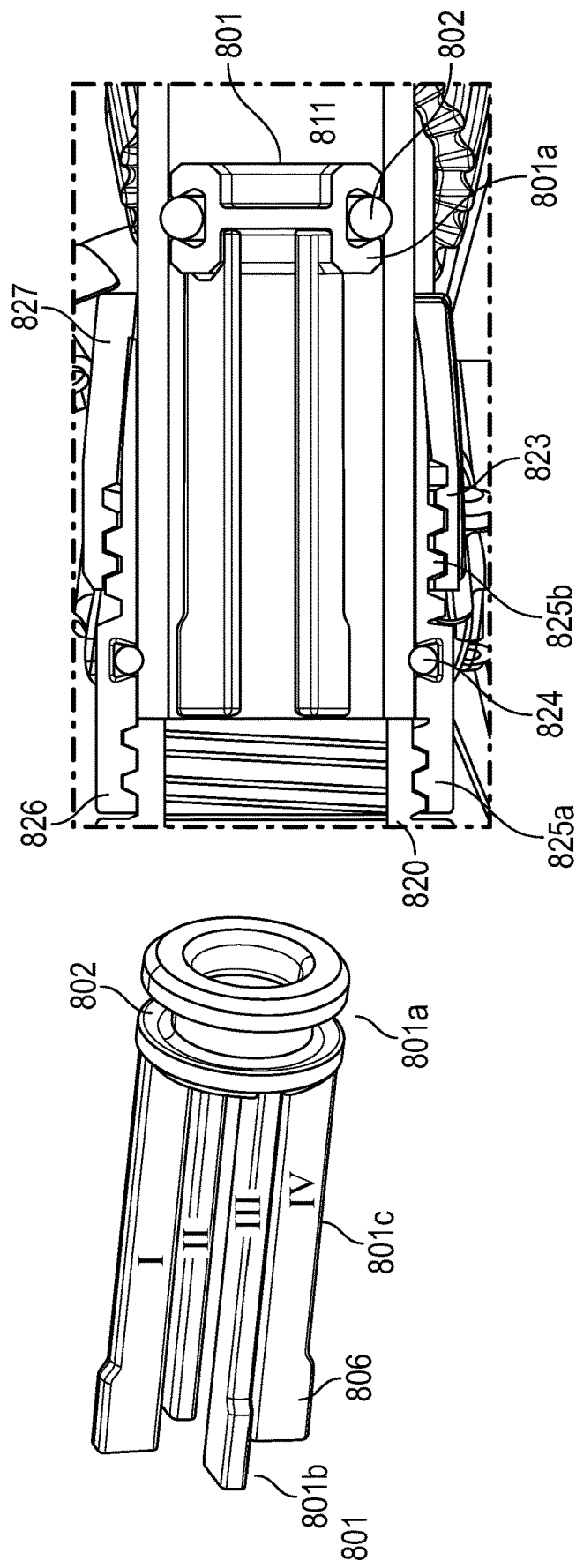

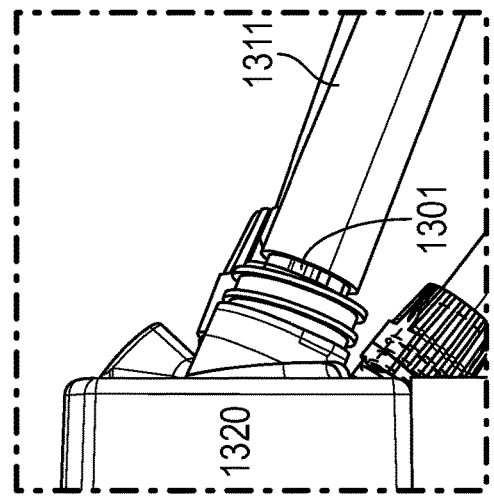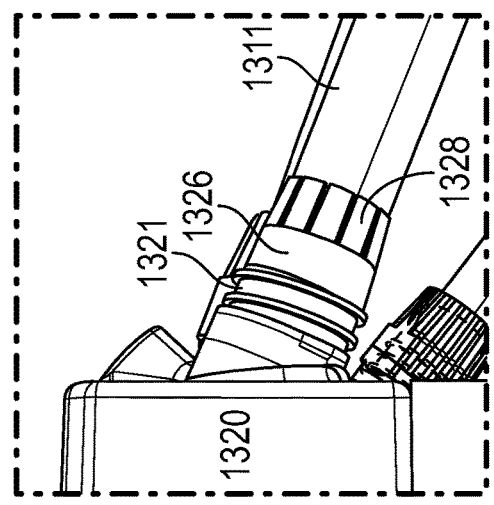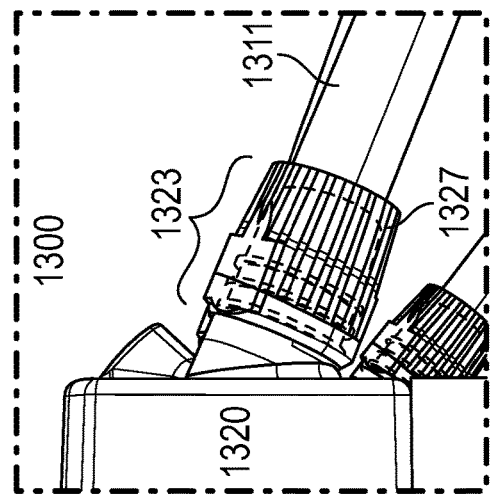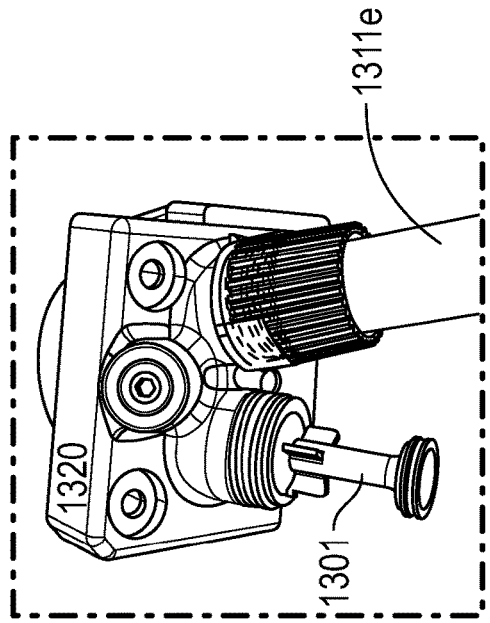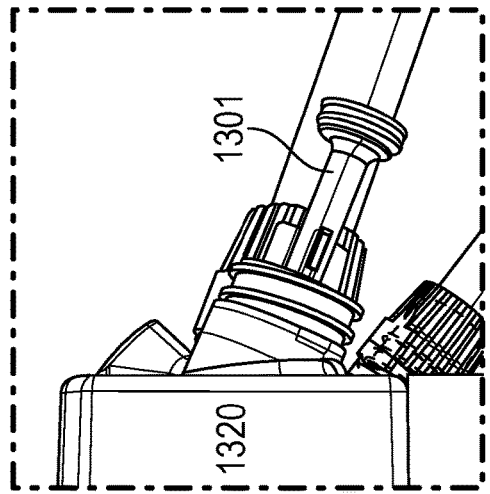

CONNECTORS

CROSS-REFERENCE TO RELATED APPLICATIONS

This application is a continuation of International Patent Application No. PCT/US2020/024933, filed Mar. 26, 2020, which claims the benefit of U.S. Provisional Patent Application No. 62/825,412, filed Mar. 28, 2019. The content of each of these applications are hereby incorporated by reference in their entirety.

BACKGROUND OF THE INVENTION

Field of the Invention

The field of the invention is a connector which may be configured to couple to a hollow structure. A plurality of connectors and hollow structures, along with functional elements, may be assembled together to form an organized or composed structure suitable for a variety of purposes. For example, when joined by connectors, a collection of hollow structures and functional elements may together form a production tool, such as a lightweight jig or fixture that may be used for support or reference measurements.

Description of the Related Technology

In a production environment, the manufacture of high-quality, usable products depends on the accuracy with which component parts can be machined and assembled. Jigs, fixtures, and gauges are production tools designed to aid in the manufacturing process. These tools, which may be customized for specific parts or applications, may be used to provide support for parts, reference surfaces for locating part features, measurement devices for testing placement, and more. For example, production tools such as jigs, fixtures, and gauges are widely used in the automotive industry at various stages of development, manufacture, assembly, and quality testing of automotive parts.

Production tools may be composed of aluminum profiles joined by brackets and outfitted with functional elements such as sensors, locators, inspection tools, or reference surfaces. While this system enables modular assembly and customization, a large structure may be heavy and cumbersome. A fixture large enough for supporting a car body, for example, may weigh over 150 kg and require cranes or forklifts to move, which impacts equipment needs, staffing, and safety. When such a large fixture is used, a production facility may need to accommodate moving equipment, and, moreover, to add staff to operate the equipment. Both factors add time and costs to the production process, at odds with demands for leaner, more efficient operations.

To address the time and costs associated with heavy aluminum-profiles, alternative production tools made of lighter materials have recently emerged. For example, frames may be made of carbon tubes instead of aluminum profiles, and joined by connectors that are individually milled and assembled. However, the connectors may still be heavy and expensive to produce, particularly when customized locators are manufactured and assembled to the connectors. There remains a need in the art for connectors suitable for assembling hollow structures and/or functional elements in order to form production tools, wherein the hollow structures may be alternatives to aluminum profiles and wherein the final assembled structure is lightweight and easy to assemble and manage.

SUMMARY

One aspect of the present disclosure relates to a connector configured to couple to a hollow structure, wherein the connector comprises: a plug comprising a first end, a second end, and a core piece extending from the first end to the second end, wherein the plug is configured to couple with the hollow structure; and a shell comprising: a wall surrounding a cavity comprising a continuous path, a first opening configured to provide a first access point to the cavity, wherein the first opening is configured to receive the plug coupled to the hollow structure, and a second opening configured to provide a second access point to the cavity, wherein the second access point leads to the continuous path.

In certain embodiments, the hollow structure may be a partially-hollow structure. For example, the hollow structure may be a tube.

The shell may further comprise a third opening configured to provide a third access point to the cavity. The third opening may be configured to receive a second plug coupled to a second hollow structure.

In certain embodiments, the shell may be attached to a functional element. The functional element may be selected from a further hollow structure, a plate, a base, an adaptor, a reference surface, a sensor, a locator, a measuring device, a simulator, a connection point, a clamp, a wheel, a spring, an actuator, a load cell, a pneumatic probe, a laser, and a suction cup.

The connector may comprise a plug having a first end, a second end, and a core piece. In certain embodiments, the first end of the plug is configured to couple with the hollow structure. The first end of the plug may be configured to fit securely inside the hollow structure. For example, the first end of the plug may comprise a sealing element configured to form a seal with a portion of an inside of the hollow structure. The core piece of the plug may comprise a plurality of legs. The second end of the plug may comprise a hook, for example, a hook configured to protrude outside of the hollow structure and engage at least one of a portion of the hollow structure or a portion of the shell. The portion of the shell may be inside the cavity.

In certain embodiments, the shell comprises a first opening, which may comprise a first surface that is configured to contact a portion of the hollow structure. The first surface of the first opening of the shell may be configured to contact a cross-sectional end of the hollow structure.

The shell may further comprise a clamp having an open position configured to receive an end of the hollow structure and a closed position configured to fasten around the end of the hollow structure. In certain embodiments, the clamp may be reversibly attached to the shell. The clamp and the shell may form a one-piece structure.

In certain embodiments, the continuous path in the cavity of the shell may extend between the second opening, the first opening and other parts of the cavity.

The second opening in the shell may be configured to receive a joining compound, for example, a joining compound selected from an adhesive, a resin, an epoxy, and a composite. A composite may be a fiber-reinforced composite.

In certain embodiments, the plug and the shell may together form a one-piece structure.

BRIEF DESCRIPTION OF THE DRAWINGS

FIGS. 6A-6D show an embodiment of a connector (600), comprising a plug (601) and a shell (620).

FIGS. 7A-7C show a certain embodiment of a connector (700), comprising a plug (701) and a shell (720).

FIGS. 8A-8D show another embodiment of a connector (800), comprising a plug (801) and a shell (820).

FIGS. 13A-13E show an embodiment of a connector (1300) comprising a plug (1301) and a shell (1320).

DETAILED DESCRIPTION OF CERTAIN INVENTIVE EMBODIMENTS

Figure 1:
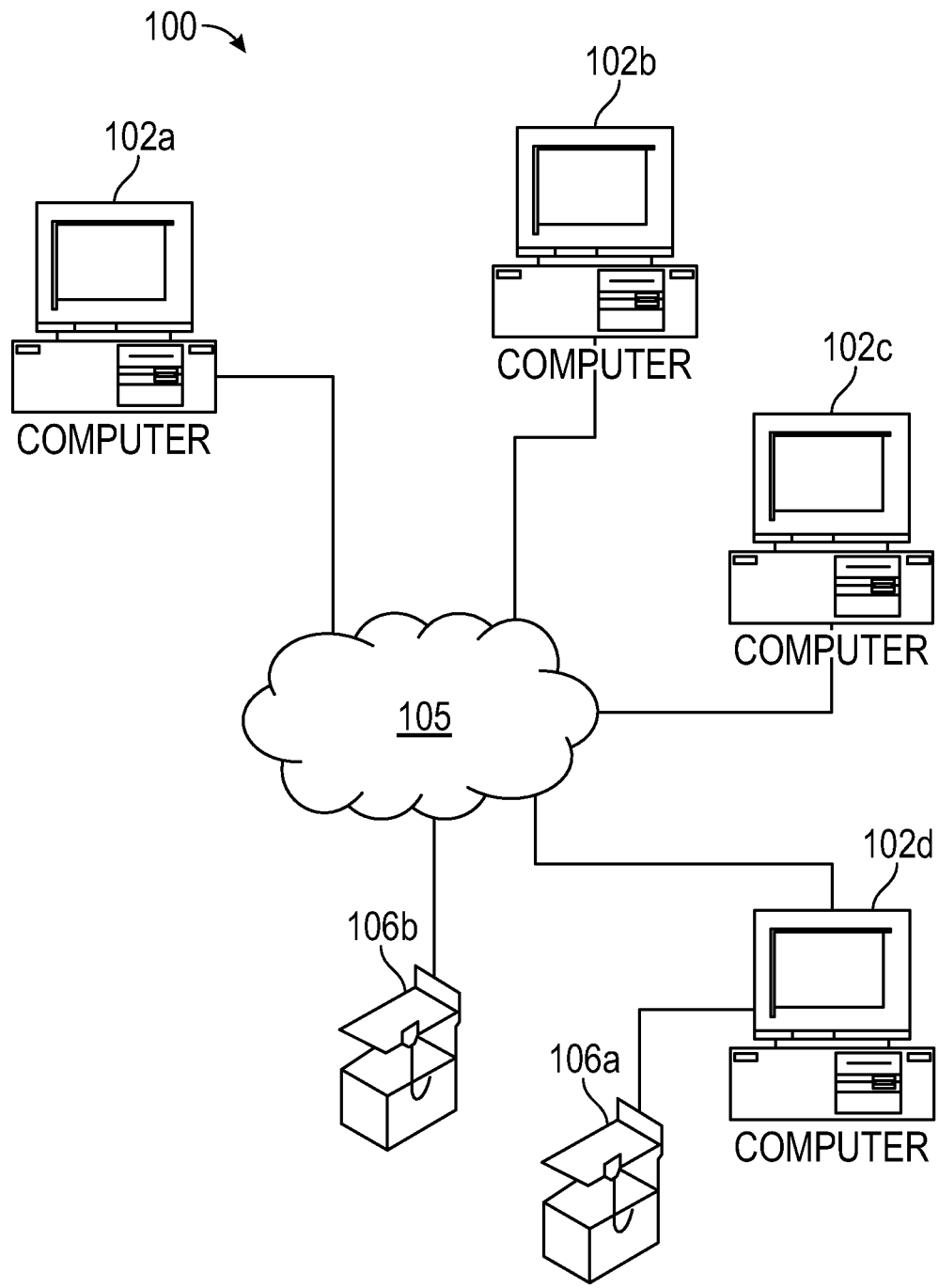
FIG. 1 illustrates an example of a computer environment suitable for the implementation of 3D object design and manufacturing.

This disclosure is made with reference to specific embodiments. Various modifications and changes may be made thereto without departing from the broader spirit and scope of the invention. The specifications and drawings are, accordingly, to be regarded in an illustrative sense rather than a restrictive sense.

Embodiments of this application relate to connectors configured for coupling to a hollow structure, for joining hollow structures together, and/or for joining a hollow structure to a functional element. A connector may be configured to couple to one or more hollow structures, and may be further configured to couple to one or more functional elements (e.g., a further hollow structure, a plate, a base, an adaptor, a reference surface, a locator, etc.). For example, a first connector may be configured to join a plurality of hollow structures, wherein a first hollow structure is coupled at a first end to the connector. At a second end of the first hollow structure, a second connector may be coupled. At least one of the first or second connector may be coupled to a functional element. Together, the plurality of connectors, hollow structures, and functional elements may together form an assembly that may be used as a production tool such as a jig or fixture. The placement of each hollow structure, functional element, and connector of the assembly may be specified by the use of the production tool.

Connectors may be configured to join (e.g., link, connect, attach) hollow structures to each other, and/or to join hollow structures to functional elements. Functional elements may comprise supporting structures, such as a base piece or base plate, or may comprise elements with further functions.

In certain embodiments, a functional element may be a gripper or a component of a gripper. For example, an assembly of hollow structures may be an industrial tool that is lighter and/or easier to assemble than a traditional version of the industrial tool made by machining or molding. Robot arms, industrial machines, or other equipment may be configured to work with an assembly of hollow structures comprising at least one functional elements. Examples of functional elements configured to work with an assembly of hollow structures include but are not limited to grippers (e.g., a holding device or a vise), vacuum inlets or outlets, lifting devices, puncturing devices (e.g., drill or awl), label applicators, fastening devices or fasteners, tightening devices, cutting devices, reference locators or surfaces, sensors, marking devices, cleaning devices, stamping devices, lasers, illuminating devices, positioning devices, and/or measuring devices, and more.

In an exemplary embodiment, an assembly, such as a fixture, may include three functional elements including a sensor, a reference surface, and a locator at three different locations in 3D space relative to the assembly. A connector may be placed at each of the three locations, wherein each connector is configured to couple with one of the functional elements (sensor, reference surface, or locator), and wherein each connector also couples with at least one hollow structure. In this configuration, the hollow structures may form a scaffold of the assembly on which the connectors and functional elements are fixedly held in their required spatial locations.

Hollow structures may be assembled into a configuration that best supports the combination of connectors and functional elements of the assembly. In turn, connectors may be customized to couple with the functional elements and with a suitable number of hollow structures to form the whole assembly. In some embodiments, connectors may be manufactured by additive manufacturing (AM). AM techniques confer greater flexibility, customization options, and more design freedom than traditional subtractive manufacturing methods. In general, the processes of design, assembly and disassembly of production tools and their component parts may be simplified and made more efficient, as compared to traditional production tools.

Additive Manufacturing Systems

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some aspects, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices or apparatuses (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
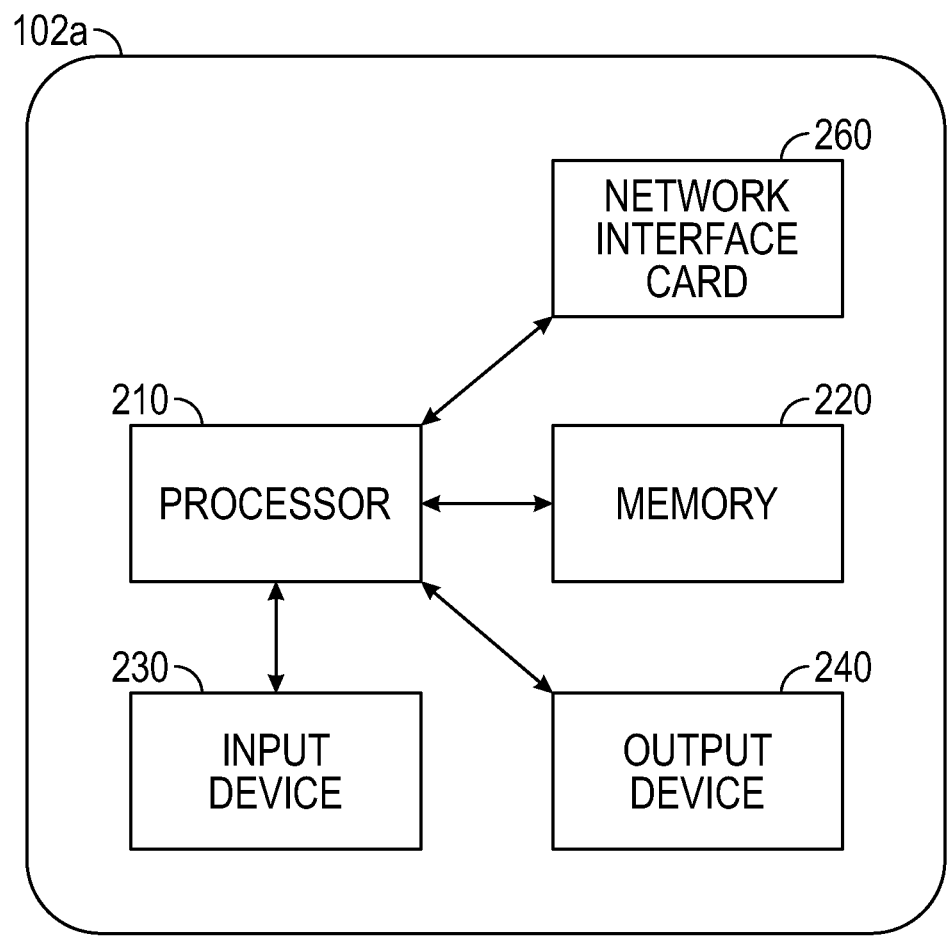
FIG. 2 illustrates a functional block diagram of one example of a computer.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a.

Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
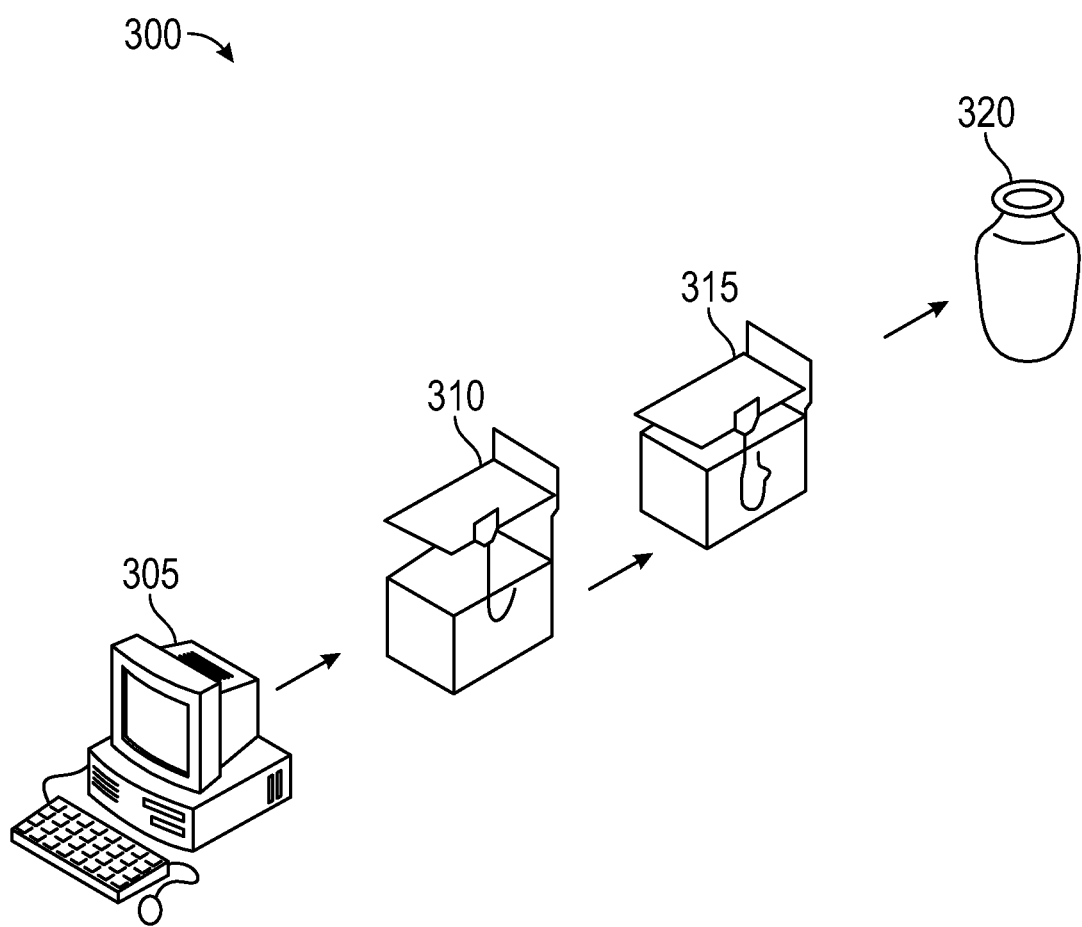
FIG. 3 shows a high level process for manufacturing a 3D object using the methods and systems disclosed herein.

FIG. 3 illustrates a process 300 for manufacturing a 3-D object or device. As shown, at a step 305, a digital representation of the object is designed using a computer, such as the computer 102a. For example, 2-D or 3-D data may be input to the computer 102a for aiding in designing the digital representation of the 3-D object. Continuing at a step 310, information is sent from the computer 102a to an additive manufacturing device, such as additive manufacturing device 106, and the device 106 commences the manufacturing process in accordance with the received information. At a step 315, the additive manufacturing device 106 continues manufacturing the 3-D object using suitable materials, such as a liquid resin.

These suitable materials may include, but are not limited to a photopolymer resin, polyurethane, methyl methacrylate-acrylonitrile-butadiene-styrene copolymer, resorbable materials such as polymer-ceramic composites, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3-Systems; the PA line of materials, PrimeCast and PrimePart materials and Alumide and CarbonMide from EOS GmbH. The VisiJet line of materials from 3-Systems may include Visijet Flex, Visijet Tough, Visijet Clear, Visijet HiTemp, Visij et e-stone, Visij et Black, Visij et Jewel, Visij et FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 320, the 3-D object is generated.

Figure 4:
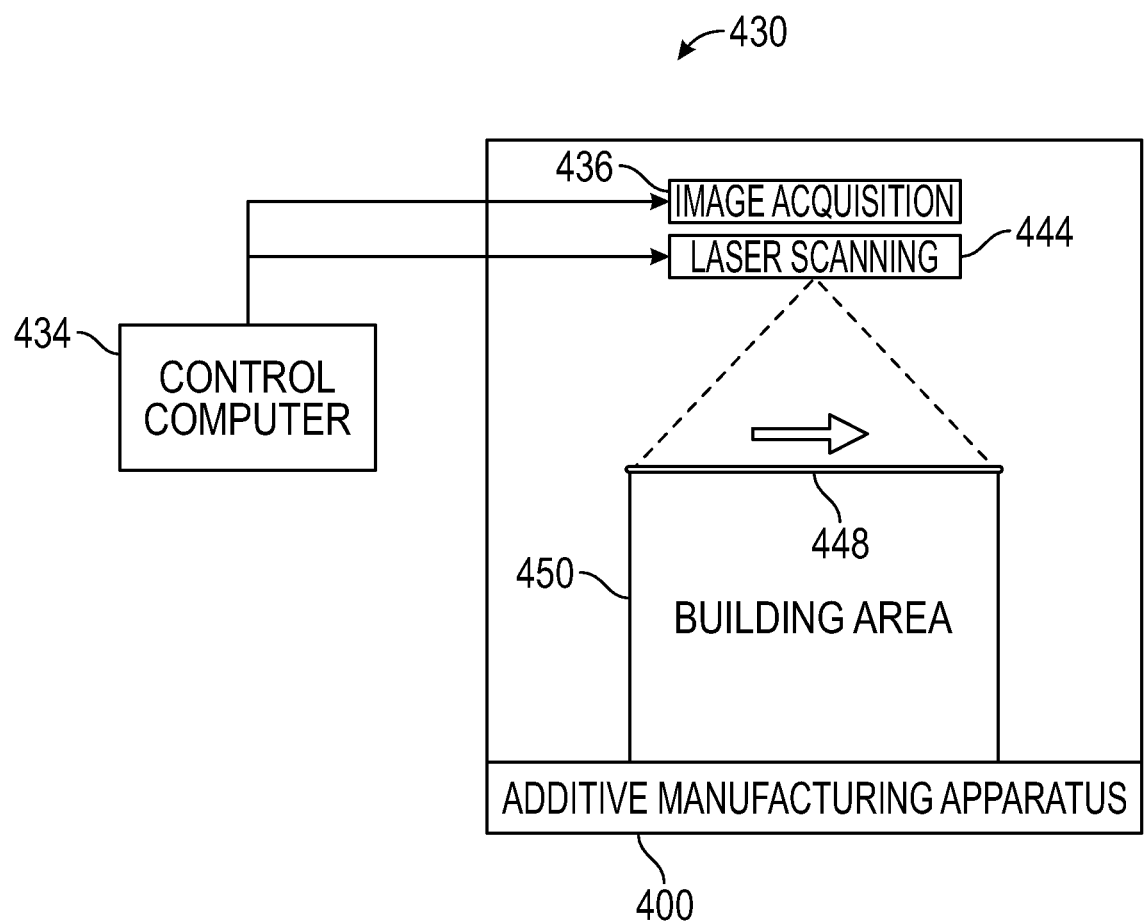
FIG. 4 is an example of a scanning system.

FIG. 4 illustrates an exemplary additive manufacturing apparatus 400 for generating a three-dimensional (3-D) object. In this example, the additive manufacturing apparatus 400 is a laser sintering device. The laser sintering device 400 may be used to generate one or more 3D objects layer by layer. The laser sintering device 400, for example, may utilize a powder (e.g., metal, polymer, etc.), to build an object a layer at a time as part of a build process.

Successive powder layers are spread on top of each other using, for example, a recoating mechanism (e.g., a recoater blade, drum, or roller). The recoating mechanism deposits powder for a layer as it moves across the build surface (448) of the building area (450), for example in the direction shown (arrow), or in the opposite direction if the recoating mechanism is starting from the other side of the build area, such as for another layer of the build. After deposition, a computer-controlled CO2 laser beam from a laser scanning device (444) scans the build surface (448) and selectively binds together the powder particles of the corresponding cross section of the product. In some embodiments, the laser scanning device (444) is an X-Y moveable infrared laser source. As such, the laser source can be moved along an X axis and along a Y axis in order to direct its beam to a specific location of the top most layer of powder. Alternatively, in some embodiments, the laser scanning device may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 400 may also optionally include a radiation heater (e.g., an infrared lamp) and/or atmosphere control device (not shown). The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

A control computer 434 may be configured to control operations of the additive manufacturing apparatus 400. The control computer may be configured to control an image acquisition device 436. In some embodiments, the control computer may be one or more computers 102 from FIG. 2 or the computer 305 from FIG. 3. In some embodiments, the control computer 434 may be a controller built into or configured to interface with the additive manufacturing apparatus 400. Taken together, the additive manufacturing apparatus 400, control computer 434, and all components may be the system 430 on which embodiments disclosed herein are built.

Various embodiments disclosed herein provide for the use of a computer control system. A skilled artisan will readily appreciate that these embodiments may be implemented using numerous different types of computing devices, including both general purpose and/or special purpose computing system environments or configurations.

Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or nontransitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The control computer 434 may be connected to a laser scanning device 444. The laser scanning device may include movable mirrors which can direct the laser beam received from a laser source into the building area. The laser source may also be a movable laser source, or it may also be the laser scanner provided in a stereolithography device 400. The control computer 434 may further include software which controls the movement and functionality of the laser scanning system 444. As such, the control computer 434 may be configured to control the moment and activation of the laser scanning device.

The control computer 434 may further be configured to interface with an image acquisition assembly 436, such as to receive data/images from the image acquisition assembly 436. The control computer 434 may further be configured to process the data/images to determine if errors have or will occur in the build process as described herein. The control computer 434 may further be configured to control when and how the image acquisition assembly 436 captures images.

The image acquisition assembly 436 may be configured to attach to, be integrated with, and/or sit separate from the additive manufacturing apparatus 400 and placed in such a position to monitor the building area 450 and/or the build surface 448. Further, the image acquisition assembly 436 may be configured to be stationary, or moveable (such as based on control signals received from the control computer 434) to monitor the building area 450 from different angles.

The image acquisition assembly 436 may be configured to acquire images of a build surface 448. More particularly, the image acquisition assembly 436 may be configured to acquire images of laser spots and/or other markings build surface 448 by the scanning system 444. The image acquisition assembly 436 may include a camera, for example, an optical camera. The camera may be a commercial off-the-shelf ("COTS") digital camera having sufficient resolution to capture spots and other markings on the build surface 448 in sufficient detail to calibrate the scanning device. In some embodiments, the image acquisition assembly is selected from an optical camera, a thermal imaging device, an IR camera, or a sensor that transfers other signals to visual signals.

Connectors

A connector may be configured to couple to a hollow structure, wherein the connector comprises: a plug comprising a first end, a second end, and a core piece extending from the first end to the second end, wherein the plug is configured to couple with the hollow structure; and a shell comprising: a wall surrounding a cavity comprising a continuous path, a first opening configured to provide a first access point to the cavity, wherein the first opening is configured to receive the plug coupled to the hollow structure, and a second opening configured to provide a second access point to the cavity, wherein the second access point leads to the continuous path.

Figure 5:
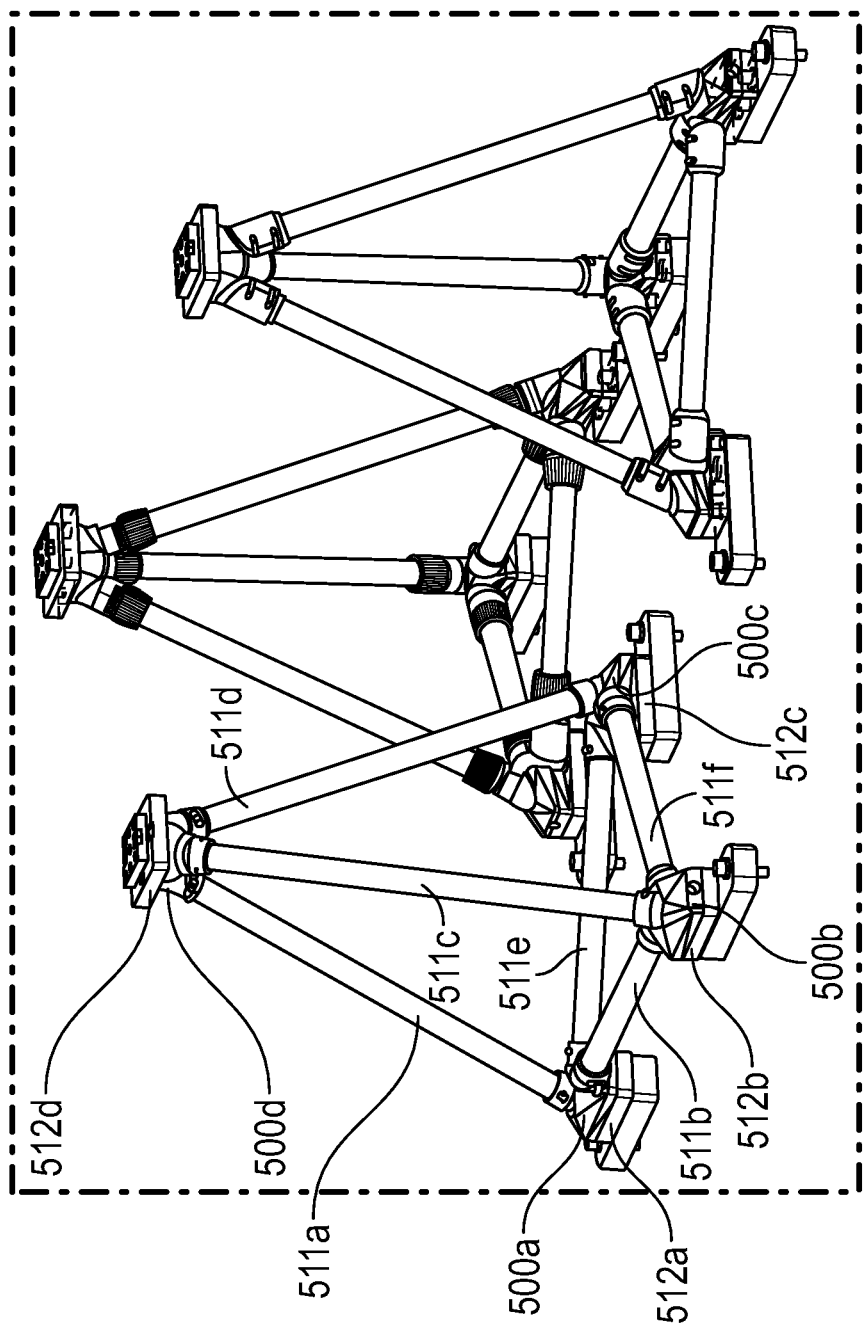
FIG. 5 shows examples of structures with connectors.

Exemplary connectors are shown in the figures. FIG. 5 shows examples of structures in which connectors (500a, 500b, 500c, and 500d) are coupled with hollow structures (511a, 511b, 511c, 511d, 511e, and 511f) and functional elements (512a, 512b, 512c, and 512d).

Hollow structures may be fully hollow, or may be partially hollow. One or both ends of the hollow structure may be open. A hollow structure may be enclosed by a single, continuous wall, such as a cylindrical wall that is uniform along its length. In certain embodiments, a hollow structure may comprise one or more walls that are not continuous, so that the hollow structure has gaps, holes, or grooves at one or more points along its length. The hollow structure may be a tube, and may have a cross sectional area of any geometrical shape, such as a circle, an ellipse, a square, a triangle, or any polygon.

Functional elements may be any type of structure, element, feature, device, or apparatus that provides a function to an assembly of a connector, hollow structure, and functional element. In some embodiments, a functional element is one of a hollow structure, a plate, a base, an adaptor, a reference surface, a sensor, a locator, a measuring device, a simulator, a connection point, a clamp, a wheel, a spring, an actuator, a load cell, a pneumatic probe, a laser, or a suction cup. A functional element may be a support structure. A functional element may be a fastener, connection, or locking mechanism configured to fasten devices to the assembly. The fastening may be reversible, so that the devices may be attached or detached from the functional element and from the assembly.

A functional element may be attached to the shell of a connector, for example, by a screw, bolt, or other mechanical fastener. A functional element may be adhered to the shell, for example, through a joining compound such as an adhesive.

FIGS. 6A-6D show an embodiment of a connector (600), comprising a plug (601) and a shell (620). A plug may have a variety of different shapes and features. In general, a plug may have a first end, a second end, and a core piece. The first end of the plug may be configured to couple with a hollow structure, for example, by fitting securely inside the hollow structure. The first end of the plug may comprise a sealing element configured to form a seal with a portion of the inside of the hollow structure. An exemplary sealing element is a groove into which an o-ring may fit. A sealing element may be a region configured to receive an adhesive or joining compound. Plugs may comprise core pieces comprising a single leg or a plurality of legs. The second end of a plug may comprise a hook configured to engage with at least one of a portion of a hollow structure or a portion of a shell, for example, on the inside of the hollow structure or in the cavity of the shell. The hook may be configured to position the plug relative to the hollow structure, for example, so that the plug is secured at the opening of the hollow structure and does not move further into the hollow structure.

FIG. 6A shows an exemplary plug (601), comprising a first end (601a), a second end (601b) and a core piece (601c). The first end of the plug (601a) comprises a groove (602). The second end of the plug (601b) comprises a plurality of fins (603a, 603b) and a hook (604).

FIG. 6B shows a cross-sectional view of the plug (601) coupled to a hollow structure (611). A sealing element in the plug comprises a groove (602) at the first end (601a) of the plug that is configured to receive an o-ring (606) (e.g., made of rubber), which provides a secure seal between the plug (601) and an inside wall of the hollow structure (611). At the second end of the plug (601b), the hook (604) extends outside of the hollow structure (611) and is engaged with a portion (e.g., outer surface or wall) of the hollow structure (611). For example, the hook (604) is configured to restrict a degree to which the plug (601) can be inserted into the hollow structure (611) through interaction with the portion of the hollow structure (611). A cross-section of the shell (620) is also visible, including a clamp (623), which closes around the end of the hollow structure (611).

Figure 6D:
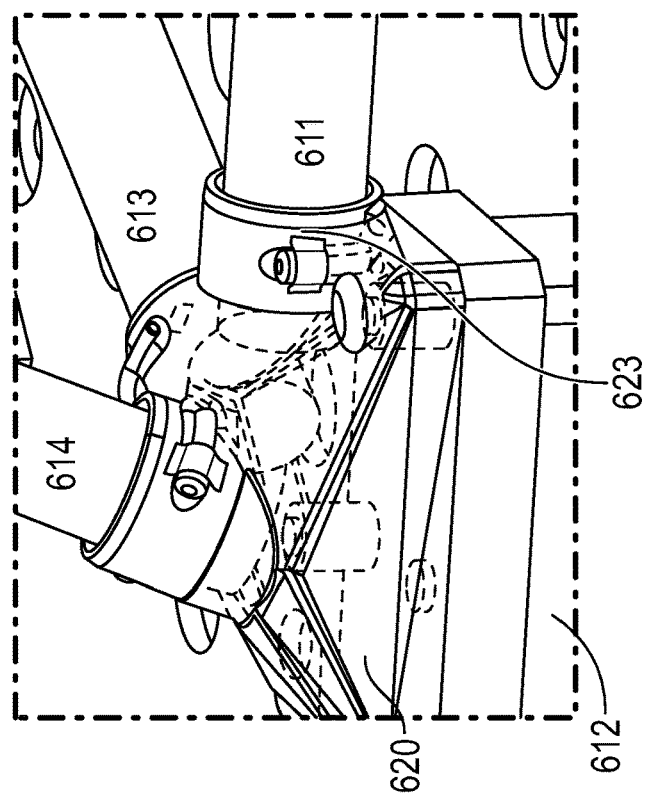
Figure 6C:
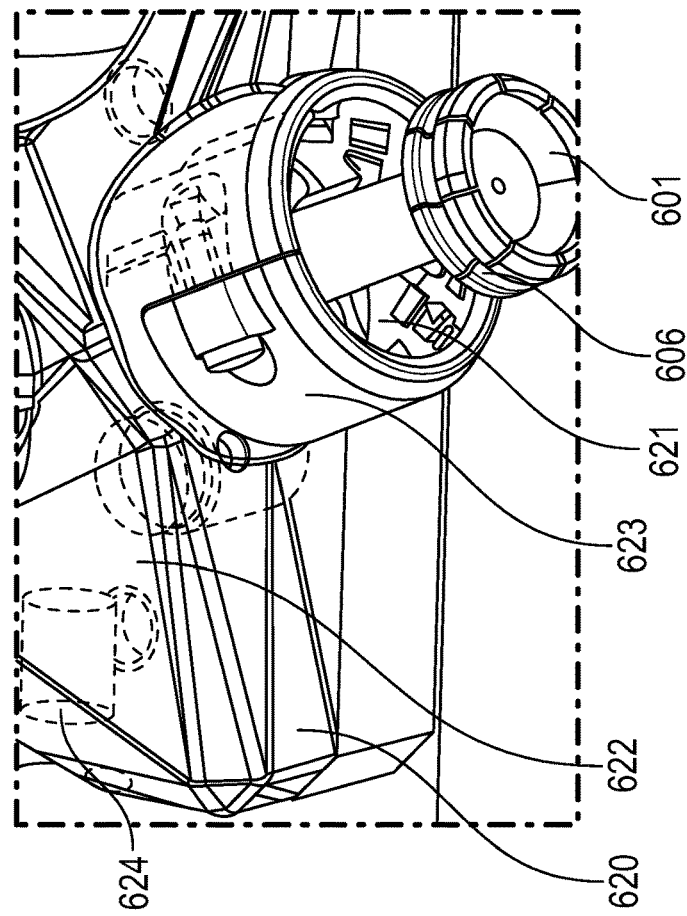

FIG. 6C shows the shell (620) and the plug (601) with o-ring (606). The plug (601) is shown in the position it will couple with the hollow structure (611, not shown). The shell (620) with its first opening (621) and cavity (622) is indicated. The shell also comprises a clamp (623), which is shown in a closed position. The shell (620) comprises a second opening (624) configured to provide a second access point to the cavity.

A shell may comprise a clamp (also "clamp mechanism" or "fastener") having an open position configured to receive an end of the hollow structure and a closed position configured to fasten around the end of the hollow structure. The clamp may be closed with a mechanical fastener such as a screw, or may be closed by clipping or screwing parts of the clamp together. A clamp may comprise one or more components which operate together to configure the clamp in an open or a closed position.

The shell and clamp may be a one-piece structure, so that the clamp is continuous with the shell. Alternatively, the clamp may be removable from the shell. The clamp and shell may be coupled together, e.g., by a mechanical fastener, or by fitting together in a conformal or complementary manner. For example, a clamp may comprise a thickened end that clicks into a complementary recess in a shell. A clamp may have a surface that is conformal with a surface at the opening of the shell.

FIG. 6D shows the outside view of an assembled shell (620), the first hollow structure (611), and a first functional element (612), which in this example is a base piece. Also shown are additional functional elements (613) and (614), which are hollow structures like (611). The plug (601) is not visible from this outside view, but is positioned inside the first hollow structure (611) as indicated in FIGS. 6B and 6C.

Figure 14B:
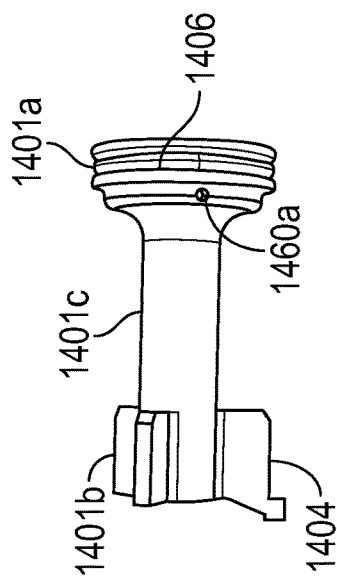
FIGS. 14A-14C show an embodiment of a connector (1400) comprising a plug (1401) and a shell (1420).
Figure 14C:
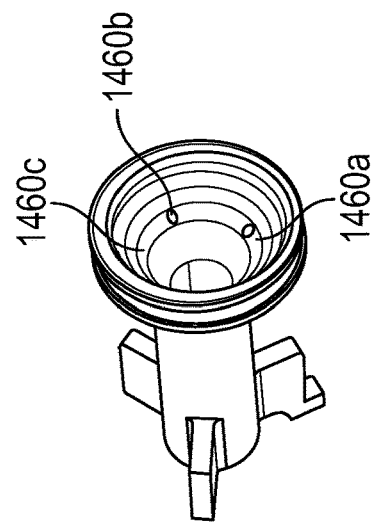
Figure 14A:
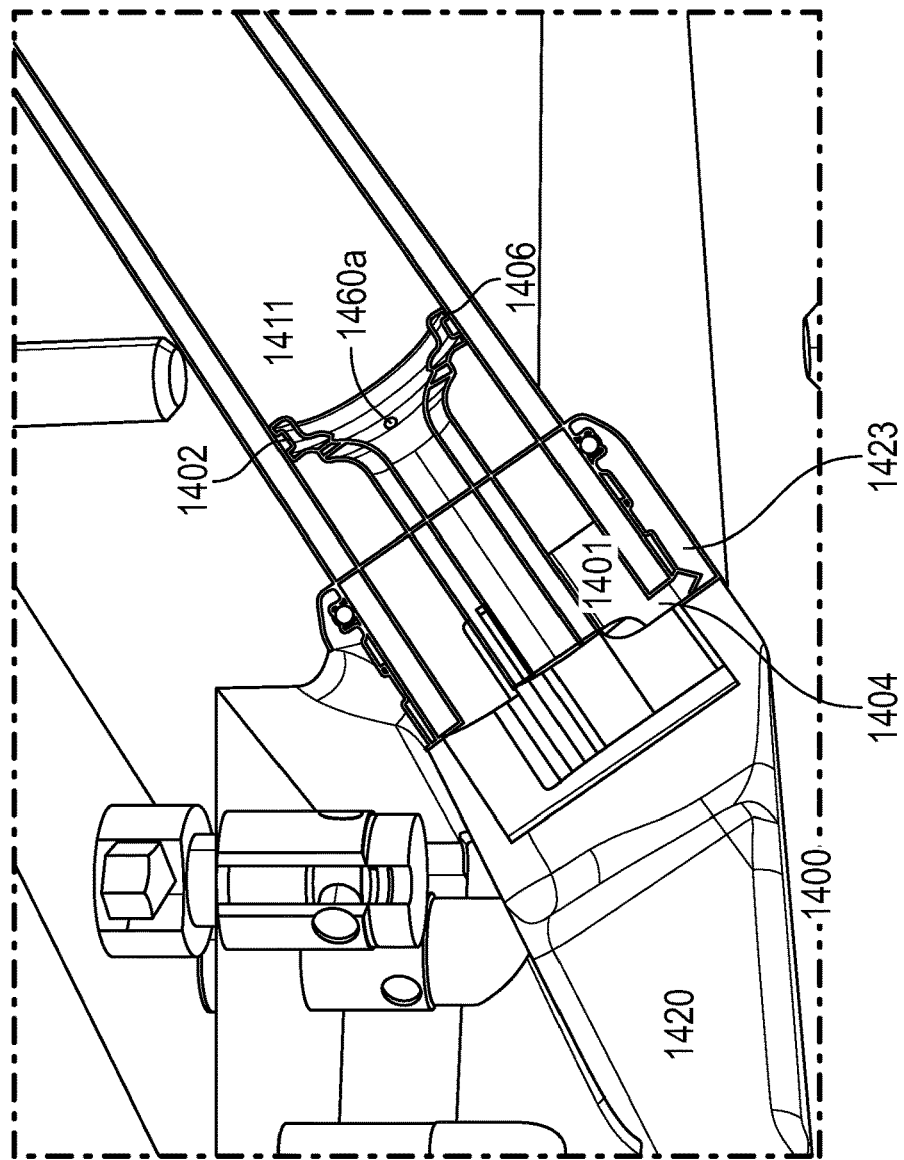

FIG. 14 shows a further example of a connector (1400) comprising a shell (1420) and plug (1401). FIG. 14A shows the plug (1401) as it is configured inside a hollow structure (1411) that is coupled to the shell (1420) and secured by a clamp mechanism (1423).

As shown in FIG. 14B, the plug (1401) comprises a first end (1401a), a second end (1401b) and a core piece (1401c). The first end of the plug (1401a) comprises a groove (1402). A sealing element in the plug comprises a groove (1402, visible in FIG. 14A) at the first end (1401a) of the plug that is configured to receive an o-ring (1406, shown in FIG. 14B) (e.g., made of rubber or silicone), which provides a secure seal between the plug (1401) and an inside wall of the hollow structure (1411). The second end of the plug (1401b) comprises a plurality of fins and a hook (1404). The hook (1404) extends outside of the hollow structure (1411) and is configured to engage with a portion (e.g., outer surface or wall) of the hollow structure (1411).

Plugs may comprise one or more vents. Vents may allow air to escape when a stiffening and/or strengthening agent (e.g., joining compound) is applied to the shell (1420). When the shell (1420), plug (1401), hollow structure (1411), and any clamp mechanism (1423) and sealing means such as an o-ring (1406) are in place, the stiffening and/or strengthening agent (e.g., joining compound) may be applied (e.g., injected) into an opening in the shell, and may fill the cavity of the shell and a portion of the hollow structure, including any space surrounding the plug. In order to allow air to vent from these hollow spaces, the shell may comprise openings. The plugs may comprise openings that may act as vents. In FIG. 6A, the grooves at the first end of the plug (601a) may be vents. These vents may provide an opening through which air can pass, and may be configured to allow only air and not the stiffening and/or strengthening agent (e.g., joining compound) to pass through. An exemplary vent may comprise one or more grooves configured around the end of the plug (601a), such that the end of the plug (601a) resembles the top of the rook in a chess set. Another exemplary vent shown in FIG. 14 may comprise one or more holes at the first end of the plug (1401a). A single hole (1460a) is visible in FIGS. 14A and 14B, while three holes (1460a, 1460b, and 1460c) are visible in FIG. 14C. Vents may take the form of one or more grooves, holes, channels, or other openings that allow air to move through cavities and hollows in and around any part of the shell, plug or the hollow structures.

At least one, two, three, four, five, or more hollow structures may be coupled to a shell. For example, a shell may comprise at least a third opening configured to provide a third access point to the cavity. The third opening may be configured to receive an additional plug coupled to an additional hollow structure. A shell may be designed with a plurality of openings in order to accommodate a plurality of hollow structures, each of which is coupled to a plug.

FIG. 11 illustrates exemplary connectors, each comprising a shell comprising a plurality of opening. Each opening is configured to receive a plug coupled to a hollow structure. FIG. 11A shows an example of a shell (1120) which has a plurality of openings. The shell is attached to a functional element (1112), which in this example is a crane eye that may be used for lifting the assembly of hollow structures.

Figure 11B:
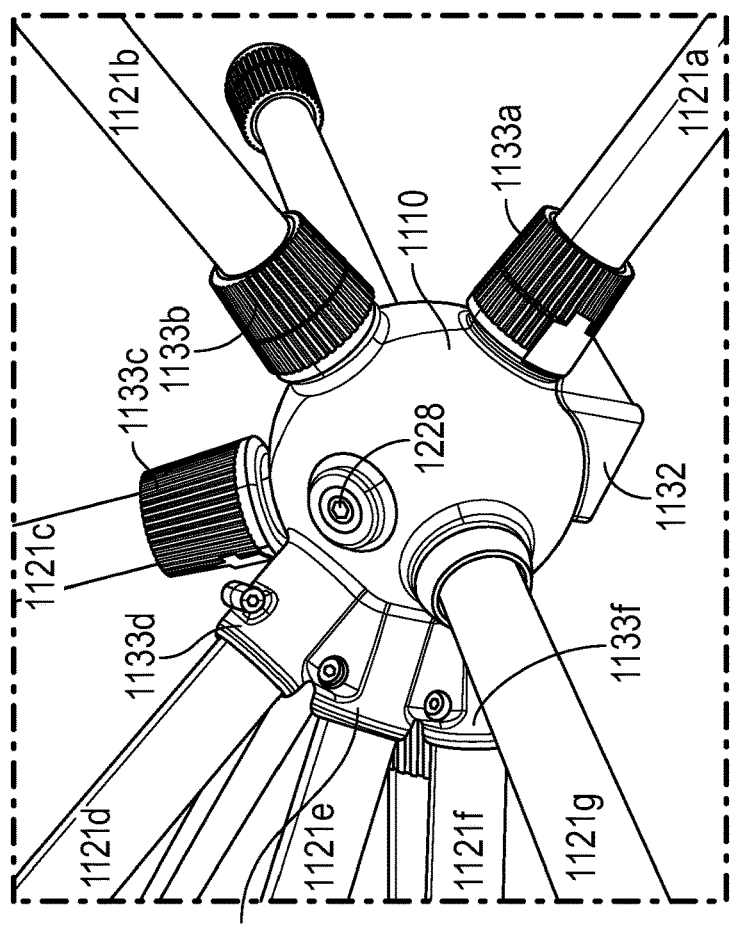
FIGS. 11A-11D show examples of shells configured to join a plurality of hollow structures and a functional element.
Figure 11A:
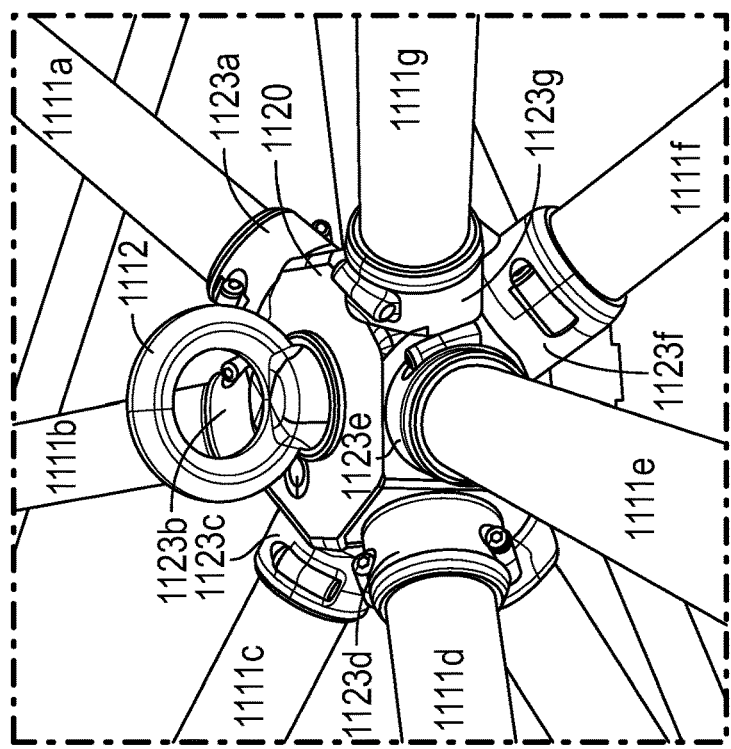

In FIG. 11A, 7 clamps (1123a-1123g) and hollow structures (1111a-1111g) positioned at openings in the shell (1120) are visible. Other clamps and hollow structures are partially visible and are not labeled. A shell may be customized to couple to as many hollow structures as are needed in an overall assembly of hollow structures. The shell may be customized to couple as many functional elements as are needed in the assembly. A shell may have a shape that is angular or curved, or both.

Figure 11D:
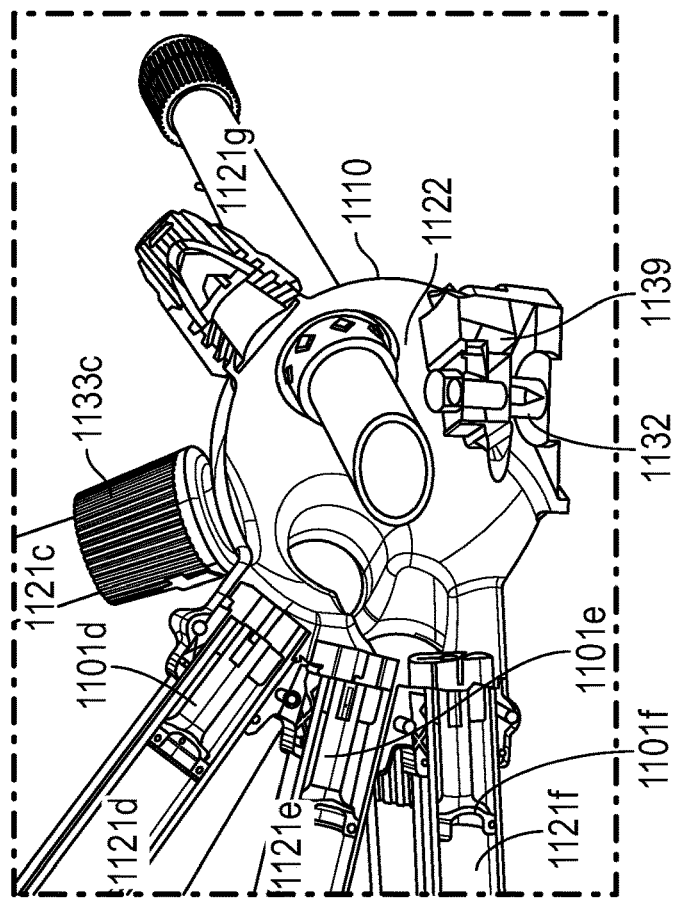
Figure 11C:
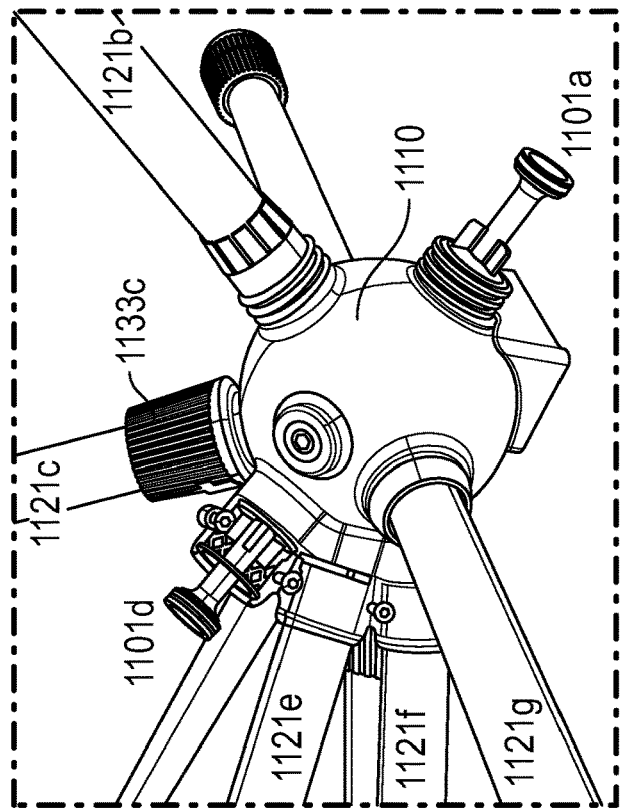

FIGS. 11B-11D show different views of another exemplary connector comprising a shell and a plug coupled to a plurality of hollow structures. More than one type of plug and/or more than one type of clamp may be used to couple the hollow structure to the shell. FIG. 11B is an outer view of a shell (1110) coupled to a plurality of hollow structures (1121a-1121f). This shell (1110) is attached to a functional element (1132) that may be used to join the assembly of hollow structures to a preassembly fixture. The functional element (1132) may be attached to the shell (1100) via a screw. One hollow structure (1121g) runs through the cavity of the shell and is secured in the shell with a sealing element like an o-ring, and is not clamped. Other hollow structures shown in FIGS. 11B-11D are not labeled. Clamps (1133d-1133f) are a first exemplary type of clamp that closes around the end of the hollow structure and is held together with screws. Clamps (1133a-1133c) are a different exemplary type of clamp that screws into place. The shell (1100) further comprises an opening (1228) that provides access to the cavity. The opening (1228) may be configured to receive a stiffening and/or strengthening agent (e.g., joining compound).

In FIG. 11C, clamps 1133a, 1133b, 1133c, 1133d, and 1133e have been partially or fully removed. Hollow structures 1121a and 1121d have been removed to show plugs (1101a and 1101d) that are positioned inside of the hollow structures. In FIG. 11D, a section of the shell (1110) has been cut away to show how the cavity (1122) of the shell is positioned in relation to the hollow structures. In this view, hollow structures 1121d, 1121e, and 1121f are also shown in cut-away view to show their position relative to plugs 1101d, 1101e, 1101f, and relative to the shell (1100) and cavity (1122). The hollow structure 1121g is shown in cut-away view to illustrate how this hollow structure traverses the cavity (1122) of the shell. Similarly, the attachment between the functional element (1132) and the shell (1110) is visible in the cut-away view. The functional element (1132) is fittingly coupled to a housing (1139), which is a portion of the shell (1100) configured to receive the functional element.

In some embodiments, at least a portion of the functional element or structures associated with the functional element may form an integral structure with the shell. A shell may comprise a structure to which a functional element may attach. For example, a shell may comprise screw threads or a clip to which a functional element may be attached. A shell may comprise a housing configured to receive and/or hold a functional element. For example, the housing may be complementary to a specific functional element, such that the housing conforms to the outer contours of the functional element. The housing may be a general opening that is configured to receive different functional elements. The functional element may be positioned relative to the hollow structures according to where a housing for the functional element is located in relation to an opening in the shell where a hollow structure is coupled. For example, in FIG. 11D, the position of the functional element (1132) in relation to the hollow structures (1121c, d, e, f, and g) may be established by the configuration of the housing (1139) relative to openings where the hollow structures are coupled.

Figure 12B:
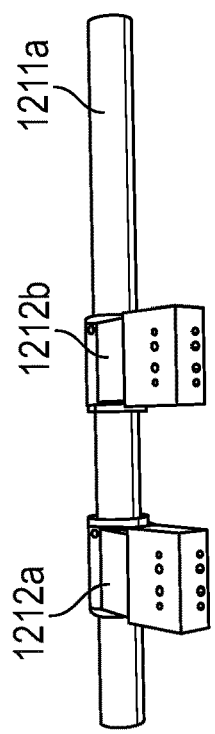
FIGS. 12A-12D show different views of an assembly comprising a plurality of hollow structures and functional elements joined together.
Figure 12A:
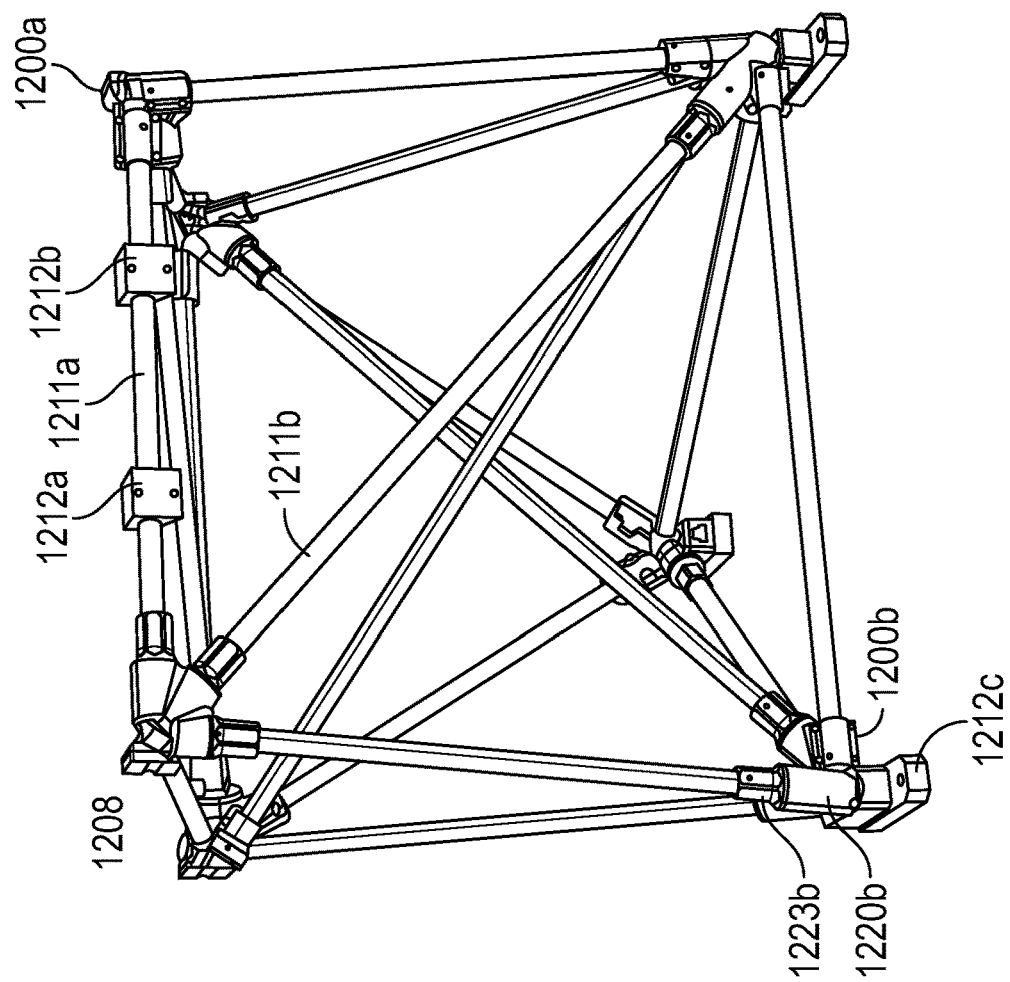

The combination of connectors, hollow structures, and functional elements may form an assembly. Features of an exemplary assembly are illustrated in FIG. 12. In FIG. 12A, an assembly (1208) comprises a plurality of connectors, hollow structures, and functional elements. Exemplary hollow structures (1211a and 1211b), connectors (1200a and 1200b), and functional elements (1212a, 1212b and 1212c) are labeled. In connector (1200b), a clamping mechanism (1223b) and a shell (1220b) are labeled. Plugs of the connectors are not visible in this view. In the assembly (1208), each connector comprising a shell and plug(s) accommodates a plurality of hollow structures. Connectors like these may function as nodes that join together an array of hollow structures oriented in different directions, and positioned relative to functional elements.

Functional elements may be configured to couple with a shell, as in FIG. 12A, where functional element 1212c attaches to shell (1220b). Functional elements may be configured to couple with hollow structures. FIG. 12A and FIG. 12B shows functional elements 1212a and 1212b coupled to a hollow structure (1211a). The functional elements may be directly coupled to a hollow structure, for example, by adhesion, clamping, and/or clipping. In some embodiments, a functional element may be coupled via an adaptor to the hollow structure.

Figure 12D:
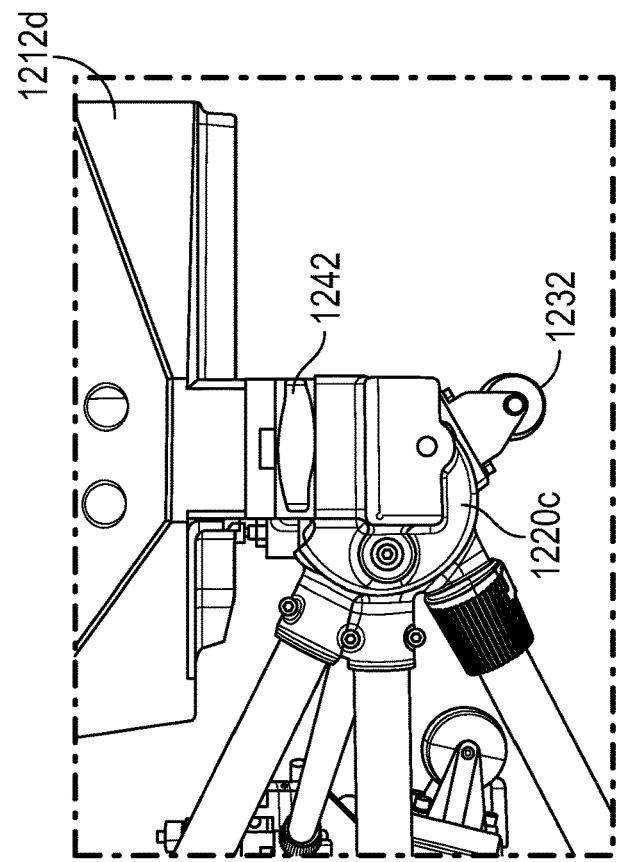
Figure 12C:
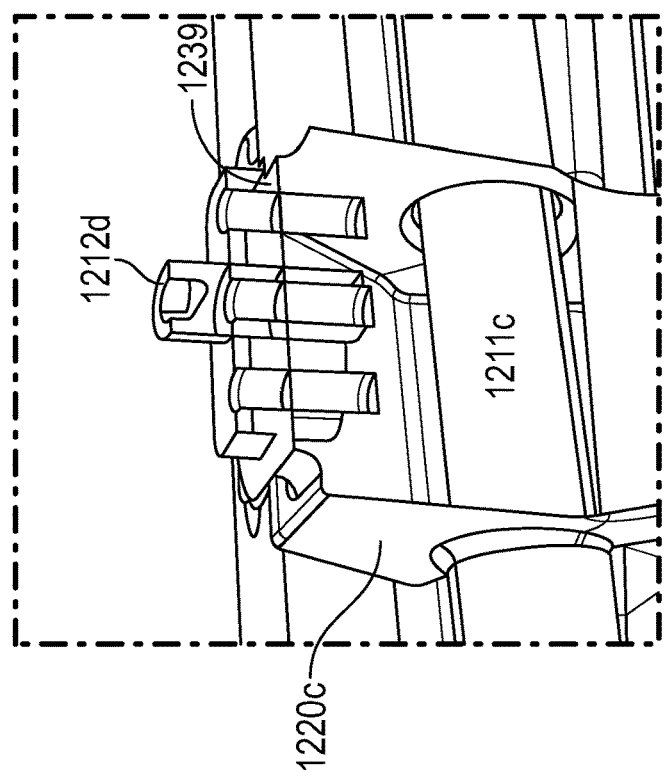

FIGS. 12C-12D further illustrate examples of a functional element in relation to hollow structures. In FIG. 12C, a shell (1220c) is configured to receive a hollow structure (1211c). In this example, the hollow structure (1211c) passes through the cavity of the shell (1220c). The hollow structure may be secured in the shell by plugs (not shown) or, alternatively, by fasteners such as o-rings that are configured to create a secure fit between the shell and the hollow structure. The shell comprises a housing (1239) into which functional elements (e.g., 1212d) are attached. FIG. 12D shows a shell (1220c) that is attached to two functional elements (1232 and 1242). Functional element (1232) is a round mechanism such as a wheel or a part of a pulley system. Functional element (1242) is a lock mechanism that may be further attached to a further functional element (1212d), or to another shell.

FIGS. 7A-7C show a certain embodiment of a connector (700), comprising a plug (701) and a shell (720).

FIG. 7A shows an exemplary plug (701), comprising a first end (701a) and a second end (701b) and a core piece (701c). The first end of the plug (701a) comprises a groove (702). The second end of the plug (701b) comprises a plurality of hooks (704a, 704b, 704c). The core piece further comprises centering elements (705a, 705b, and 705c), which may be used to center the plug (701) inside a hollow structure.

FIG. 7B shows a cross-sectional view of the plug (701) coupled to a hollow structure (711). The groove (702) at the first end (701a) of the plug is configured to receive an o-ring (not shown), which provides a secure seal between the plug (701) and the hollow structure (711). At the second end of the plug (701b), hooks (704a and 704c are shown in this view) extend outside of the hollow structure (711) and are engaged with a portion of the hollow structure (711). A cross-section of the shell (720) is also visible, including a clamp (723) having an o-ring (724), which closes around the end of the hollow structure (711).

FIG. 7C shows an outside view of an assembled shell (720), the hollow structure (711), and a first functional element (712), which in this example is a base piece. Also shown are additional functional elements (713) and (714), which are hollow structures like the first functional element (711). The plug (701) is not visible from this outside view, but is placed inside the hollow structure (711) as indicated in FIG. 7B.

FIGS. 8A-8D show another embodiment of a connector (800), comprising a plug (801) and a shell (820).

FIG. 8A shows an exemplary plug (801), comprising a first end (801a) and a second end (801b) and a core piece (801c). The first end of the plug (801a) comprises a groove (802). The core (801c) comprises a plurality of individual legs (labeled i, ii, iii, and iv), each having a foot (806).

FIG. 8B shows a cross-sectional view of the plug (801) coupled to a hollow structure (811), which in this example is a hollow tube. The groove (802) at the first end (801a) of the plug is configured to receive an o-ring (not shown), which provides a secure seal between the plug (801) and the hollow structure (811). A cross-section of the shell (820) is also visible, including a clamp mechanism (823) that closes around the end of the hollow structure (811). The clamp mechanism (823) comprises first screw threads (825a) that attach a first holder (826) to the shell (801) and further comprises second screw threads (825b), which secure the first holder (826) to the second holder (827). In FIG. 8B, the clamp mechanism (823) is closed and holding the hollow structure (811) in place. If the first holder (826) and the second holder (827) are unscrewed and disengaged, then the clamp mechanism (823) releases the hollow structure (811).

Figure 8D:
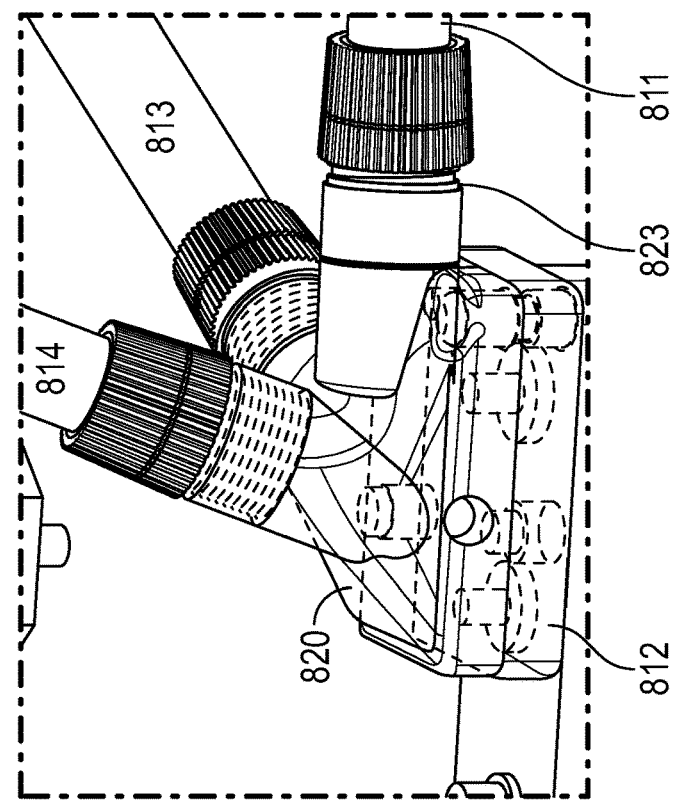
Figure 8C:
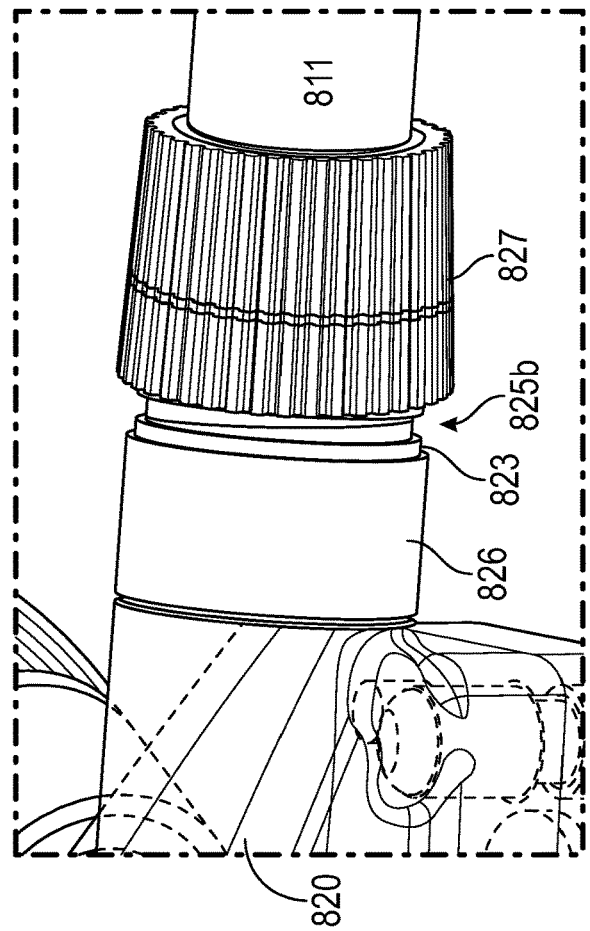

FIG. 8C shows a close-up of the outside of shell (820), clamp mechanism (823), and hollow structure (811). The first holder (826) and second holder (827) are engaged via the second screw threads (825b) which are visible in this view.

FIG. 8D shows an outside view of an assembled shell (820), hollow structure (811), and first functional element (812), which in this example is a base piece. Also shown are additional functional elements (813) and (814), which are also hollow structures. The plug (801) is not visible from this outside view, but is placed inside the hollow structure (811) as indicated in FIG. 8B.

FIG. 13 shows a further example of a connector (1300) comprising a shell (1320) and a plug (1301). The plug is coupled to a hollow structure (1311), which is positioned at the opening of the shell (1320). FIG. 13A shows an outside view of the shell (1320), hollow structure (1311), and clamp mechanism (1323) comprising a first holder (1326, not visible in FIG. 13A) and a second holder (1327). The second holder attaches to the shell (1320) via screw threads. In this example, the opening of the shell has screw threads which engage with the screw threads on second holder (1327) of the clamp mechanism (1323).

FIG. 13B shows a view of the connector and hollow structure when the second holder (1327) has been removed. The screw threads (1321) on the shell (1320) are visible in this view. The first holder (1326), also visible in this view, may be a separate piece closes around the end of the hollow structure (1311). In certain embodiments, a turn of the second holder (1327) in a clockwise direction not only attaches the second holder (1327) to the shell (1320), but also moves the clamp mechanism (1323), together with the first holder (1326), in a direction axial to the hollow structure (1311) and towards the shell (1320). This movement cause the first holder (1326) to compress, as the distal end (1328) grips the hollow structure more firmly. The hollow structure may turn and fit in a more secure grip in first holder (1326). Accordingly, the combination of the hollow structure (1311), first holder (1326), and second holder (1327) may be more securely fastened to the shell (1320).

In some embodiments, rotating the first holder (1326) around the end of the hollow structure may cause a distal end (1328) to grip the hollow structure more firmly. The distal end may comprise one or more projections that move in relation to each other when the first holder is turned around the end of a hollow structure. For example, the projections may move closer to one another when the first holder is turned in a clockwise direction around the end of the hollow structure, thereby gripping the end of the hollow structure more tightly. The projections may move further from one another when the first holder is turned in a counterclockwise direction around the end of the hollow structure, thereby loosening the end of the hollow structure.

The first holder may be placed at the end of the hollow structure before the hollow structure is attached to the shell (1320) and secured using the second holder (1327). In certain embodiments, the first holder (1326) may be integral with the shell and/or the second holder (1327) of the clamp mechanism (1323) so that it is attached in a continuous structure. Alternatively, the first holder (1326) may be a separate piece that contacts shell and/or the second holder (1327), and engages with these structures. The exemplary first holder (1326) in FIG. 13B contacts the opening of the shell at one end, and closes firmly around the end of the hollow structure (1311). The second holder (1327) fits over the first holder (1326). The clamp mechanism may further comprise additional connecting means, such as a clip or screw threads, to connect the second holder (1327) to the first holder (1326). In some embodiments, the first holder (1326) may fit firmly inside the second holder (1327), without a need for additional connection means. For example, the inner diameter of the second holder (1327) may be sized to fit firmly around the outer diameter of the first holder (1326).

In FIG. 13C, the first holder (1326) has been removed, and a portion of the plug (1301) is visible between the shell (1320) and the hollow structure (1311). In FIG. 13D, the hollow structure (1311) has been removed to show the orientation of the plug (1301). FIG. 13E is an alternative view of the shell (1320), showing the plug (1301) as it is positioned relative to the shell (1320) and a neighboring hollow structure (1311e).

In some embodiments, exemplary connectors may comprise a plug and a shell that together form an integral, one-piece structure. Such a connector may contact only the interior surfaces of a shell and/or a hollow structure, or may contact only the exterior surface of a shell and/or a hollow structure. A connector may contact an interior surface of a shell and an exterior surface of a hollow structure, or vice versa.

Figure 9C:
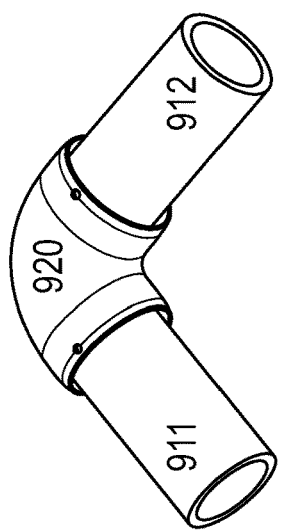
FIGS. 9A-9C show an exemplary connector (900) in which the plug (901) and the shell (920) are connected to each other.
Figure 9B:
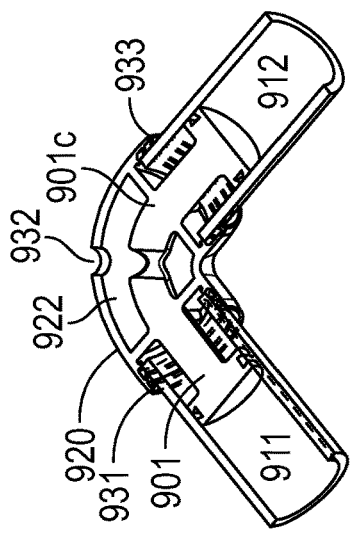
Figure 9A:
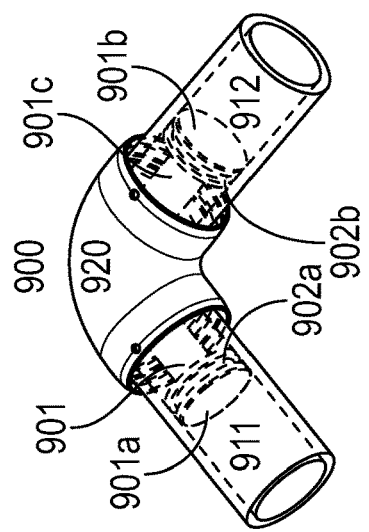

FIGS. 9A-9C show an exemplary connector (900) in which the plug (901) and the shell (920) are connected to each other, for example, as a continuous one-piece structure.

FIG. 9A shows an outside view of the connector (900), as engaged with a first hollow structure (911) and a second hollow structure (912), which are shown as transparent structures so that the elements of the connector are visible. The connector (900) comprises a shell (920) and a plug (901) having a first end (901a), a second end (901b), with a core piece (901c) in between. In this example, the first end (901a) and the second end (901b) of the plug are identical, and each comprise a groove (902a and 902b) which are configured to receive an o-ring (not shown).

FIG. 9B is a cut-away view of the connector (900). The shell (920) comprises a first opening (931) into which a portion of the hollow structure (911) fits; a second opening (932) that provides an access point to the cavity (922), which comprises a continuous path extending through most of the cavity. For example, the first opening (931), cavity (922), and second opening (932) all fall along a path of the continuous cavity (922). There is also a third opening (933), into which a portion of a second hollow structure (912) fits. The core piece (901c) of the plug (901) is curved and is connected to the shell (920).

Figure 10C:
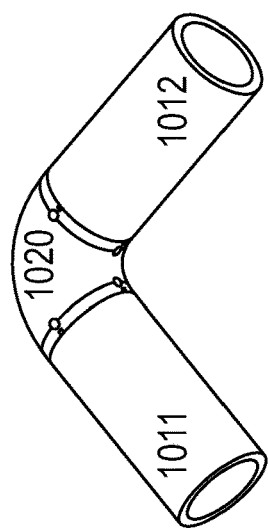
FIGS. 10A-10C show an example of a connector (1000) in which a portion of the shell (1020) extends into the hollow structure (1011).
Figure 10B:
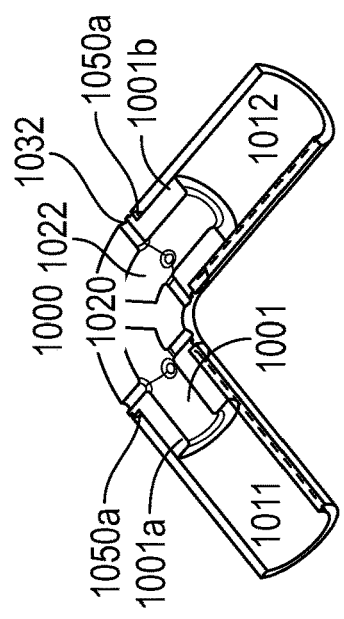
Figure 10A:
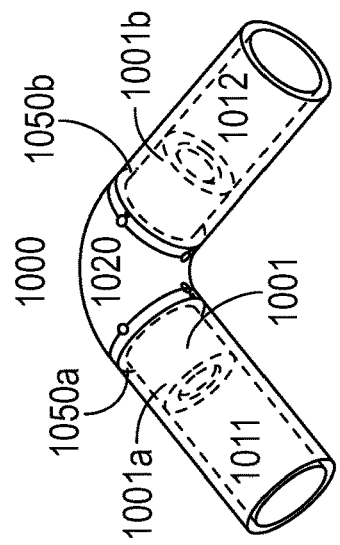

FIG. 9C shows an outside view of the shell (920), a first hollow structure (911) and a second hollow structure (912). The plug is not visible in this view. FIGS. 10A-10C show another example of a connector (1000) in which a portion of the shell (1020) extends into the hollow structure (1011). The plug in this connector is not shown.

FIG. 10A shows an outside view of the connector (1000), as engaged with a first hollow structure (1011) and a second hollow structure (1012), which are shown as transparent structures so that the elements of the connector are visible. The connector (1000) comprises a shell (1020) having a first end (1001a) and a second end (1001b). In this example, the first end (1001a) and the second end (1001b) of the shell are identical. In this connector (1000), the first hollow structure (1011) and the second hollow structure (1012) contact a ledge (1050a and 1050b) on the shell (1020). The plug is not shown in this view, but may be attached to the shell (1020), or may be a separate piece.

FIG. 10B is a cut-away view of the connector (1000). The shell (1020) comprises an opening (1032) that provides access to a portion of the cavity (1022). FIG. 10C shows an outside view of the shell (1020), a hollow structure (1011) and a second hollow structure (1012).

Figures 15A, 15B:
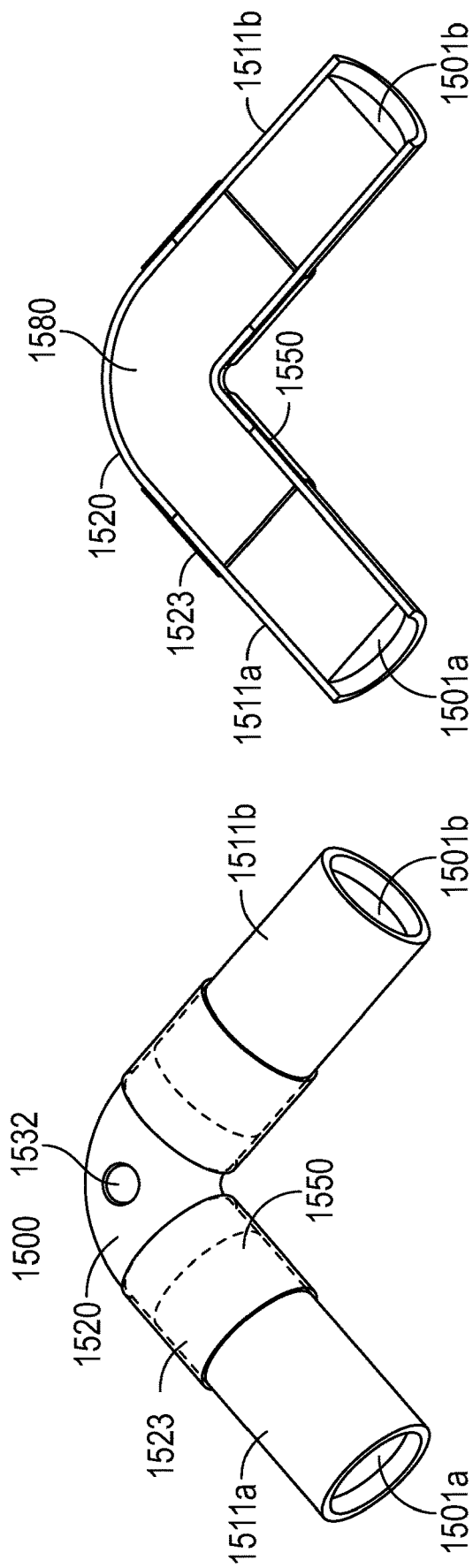
FIGS. 15A-15B show an embodiment of a connector (1500) comprising a plug (1501) and a shell (1520).

FIGS. 15A-15B show a further example of a connector (1500) comprising a shell (1520) and a plug (e.g., 1501a). FIG. 15A shows a connector (1500) that joins two hollow structures (1511a and 1511b). The connector (1500) comprises a shell (1520) and a plug (1501a). Plug (1501a) fits inside a hollow structure (1511a). In some embodiments, a plug may comprise a first end, a second end, and a core piece extending from the first end to the second end. The plug may have any shape that is configured to form a physical barrier in the hollow structure. For example, a plug may be a geometric shape (e.g., a cylinder or a cube) that is sized to fit inside the hollow structure, without any gaps between an inner surface of the hollow structure and an outer surface of the plug. A plug may have at least two configurations, a first configuration where at least a first portion of the plug forms a physical barrier inside of the hollow structure, and a second configuration in which at least this first portion of the plug is smaller than hollow structure and moves freely into the hollow structure. Accordingly, the plug (or at least first portion of the plug) while in its second configuration may be inserted into the hollow structure and positioned inside the hollow structure, whereupon the plug (or at least first portion of the plug) may be moved or changed to its first configuration where it forms a barrier inside of the hollow structure.

An exemplary plug with two configurations may be a plug with parts (e.g., arms) that expand in a first configuration and fold or retract in a second configuration. A plug may be formed or partially-formed from a material that compresses and expands, such as a foam or an elastic material.

In certain embodiments, a plug may be cap that forms a physical barrier and seals off the open end of a hollow structure. A plug may be a piece that fits outside, around, or inside a hollow structure, and is separate and/or separable from the hollow structure. In some embodiments, a plug may be integral with the hollow structure. For example, a simple plug may be a closed end of a hollow structure, wherein the closed end is integral with the hollow structure. The closed end may be made of the same material as the hollow structure, and may be a continuous, one-piece structure. The closed end may be made of a different material than the hollow structure but not separate and/or separable (e.g., the plug is non-reversibly attached to the hollow structure, for example by welding, fusing, or other means of attachment), such that the plug and the hollow structure function as a one-piece structure. As described herein, hollow structures may be hollow along their whole length or along at least a portion of their length. A hollow structure may also have an internal channel that is continuous along the length of structure, or that is interrupted along the length of the structure. Hollow structures may have one or more closed end through which no material (e.g., liquid, gas, or joining compound) may pass, and the means of closure, whether separate from or integral to the hollow structures, may be a plug.

In some embodiments, a plug fits over the exterior of the hollow structure. For example such a plug may be configured as an adaptor between the hollow structure and the shell, wherein the plug has a first end configured to contact an exterior surface of the hollow structure and a second end configured to contact a surface of the shell. A plug may have at least two configurations, such as a first configuration in which a portion of the plug may be movably positioned around the end of the hollow structure, and a second configuration in which the plug securely grips or holds the end of the hollow structure.

In an exemplary connector (1500), a shell (1520) may comprise a first opening having a first surface configured to contact a surface of the hollow structure, thereby forming an interface (1550). In FIG. 15A, the rim of the opening in the shell may contact the cross-sectional end of the hollow structure to form the interface (1550). In some embodiments, a portion of the shell may be configured to receive the hollow tube, or conversely, a portion of the shell may be configured to fit inside of the hollow tube.

The shell (1520) and the hollow structure (1511*a*) may be held together or secured at their internal surfaces, for example, by a stiffening and/or strengthening agent (e.g., joining compound) like an epoxy, an adhesive, or a composite compound. The shell (1520) may be configured with a second opening (1532) for receiving the stiffening and/or strengthening agent (e.g., joining compound). In some embodiments, a joining compound is injected or applied through the second opening (1532) and fills the cavity of the shell and a portion of the inside of the hollow structure. FIG. 15B is a cut-away view of the connector and hollow structures, showing how the joining compound (1580) forms a continuous internal filling that joins the shell (1520) to a first hollow structure (1511*a*) and to a second hollow structure (1511*b*). The joining compound (1580) is prevented by the physical barrier of the plug (1501*a*) from flowing further into the hollow structure (1511*a*), and similarly, is prevented by plug (1501*b*) from flowing further into the hollow structure (1511*b*).

In some embodiments, a shell may comprise an external wrap or clamp that joins a hollow structure to one or more hollow structures. In certain embodiments, the connector (1500) may further comprise an external mechanism that secures the shell (1520) and the hollow structure (1511*a*). An external mechanism may be a clamp mechanism as described herein, or may be one or more of a sleeve, sock, shrink tubing, tape, film, or other wrap that is configured to enrobe the exterior of the shell (1520) and the hollow structure (1511*a*) where they join at the interface (1550). An exemplary external mechanism (1523) is shown in FIG. 15A. In some embodiments, a shell may be joined to a hollow structure by internal means (e.g., joining compound applied into the cavity of the shell) or external means (e.g., a clamping mechanism or an exterior wrap around the outer surface of the hollow structure), or a combination of both internal and external means.

The shell (1520) may have additional openings that are configured to receive a further plug and a hollow structure, or to contact one or more hollow structures, thereby joining them together. In FIG. 15A, the exemplary shell (1520) is configured to contact a first hollow structure (1511*a*) and a second hollow structure (1511*b*).

In certain embodiments, a first opening in the shell comprises a first surface that is configured to contact of portion of the hollow structure. The portion of the hollow structure may be a cross-sectional end of the hollow structure. The first surface of the shell may comprise a reference surface to position the hollow structure. One example of a reference surface may be a surface that the cross-sectional end of the hollow structure contacts and does not move away from. An example of a first surface of the shell is the ledge (1050*a* and 1050*b*) on the shell (1020) in FIG. 10A. Each ledge contacts a cross-sectional surface of a hollow structure (1011 or 1012).

In certain embodiments, the end of the hollow structure may be inserted into the cavity through the first opening in the shell. In certain embodiments, the hollow structure may be positioned onto first surface of the first opening of the shell, without having to insert the hollow structure into the cavity. This enables a sideways assembly of hollow structures onto shells. In certain embodiments, a hollow structure may be telescoping, so that it may be inserted into the first opening of a shell or positioned onto a first surface of the first opening of a shell, when the shell is already fixed in place and/or is difficult to access. For example, placing a final (or later) hollow structure may be challenging after a plurality of other hollow structures have already been placed into or onto a shell, as the other hollow structures may fix the connector in place and limit the angles from which the final hollow structure may be positioned.

A Continuous Path Through the Cavity

In certain embodiments of the connector, the shell comprises: a wall surrounding a cavity comprising a continuous path, a first opening configured to provide a first access point to the cavity, wherein the first opening is configured to receive the plug coupled to the hollow structure, and a second opening configured to provide a second access point to the cavity, wherein the second access point leads to the continuous path. The continuous path may extend between the first opening in the shell, the second opening in the shell, and other parts of the cavity. In certain embodiments, the continuous path extends through most of the cavity.

The continuous path in the shell may be used to strengthen an assembly comprising a connector and a hollow structure, and, optionally, further comprising a functional element, as a stiffening and/or strengthening agent may be applied to fill the continuous path. For example, the second opening in the shell may be configured to provide a second access point to the cavity, wherein the second access point leads to the continuous path. The second opening in the shell may be configured to receive a stiffening and/or strengthening agent such as a joining compound. A joining compound may be an adhesive, a resin, an epoxy, a composite, or a mix of any of these. In certain embodiments, the composite may be a fiber-reinforced composite, such as a carbon fiber composite. The joining compound may bind to surfaces of the shell of the connector, the hollow structure, the functional element, and may cure, harden, solidify, etc., to strengthen the connections and/or increase stiffness of the assembled structure.

Surfaces which contact the stiffening and/or strengthening agent (e.g., joining compound) may be uneven, irregular, rough, or textured in order to facilitate the binding of the joining compound to structures in the connector. For example, an inner surface of the shell, or a cross-sectional surface, an inner surface, or an outer surface of the hollow structure, and/or any portion of the connector may be uneven, irregular, rough, or textured. Any microstructures or macrostructures may be used to produce this surface, such as raised bumps, channels, grooves, ribs, striations, pits, ridges, or steps. These structures may be regularly arrayed or may be randomly placed on a surface or a portion of a surface of the connector. In certain embodiments, a rough surface may be the result of the technology used to build the connector. For example, if additive manufacturing (AM) techniques are used to form a connector, unfinished surfaces in the connector may be rough. In certain embodiments, a rough surface may result from post-finishing (e.g., sanding, dimpling, or pock-marking a smooth surface).

In some embodiments, surfaces which contact the stiffening and/or strengthening agent (e.g., joining compound) during at least a first time point may be smooth. For example, a smooth surface may be used to prevent the joining compound from binding to the smooth surface during this first time point. A smooth surface may be a channel or groove used to guide the joining compound, but which itself does not bind to the joining compound. At least one smooth surface or portion of a surface may be the result of the technology used to build the connector, or, the smooth surface may result from post-finishing (e.g., polishing) a rough surface.

When stiffening and/or strengthening agent (e.g., joining compound) is applied to the second opening in the shell, the joining compound may move along the continuous path and eventually fill the cavity. The joining compound may also move out of the first opening of the shell and around the second end of the plug. The joining compound may surround the core of the plug, and further contact the inside of the hollow structure, but may not be able to move past the first end of the plug, which is securely positioned inside of a hollow structure. In certain embodiments, the joining compound may surround the outside of the hollow structure, for example, if a clamp mechanism is configured to receive a joining compound applied either through the second opening or directly to the clamp and outside of the hollow structure.

In certain embodiments, the shell may comprise at least one evacuation (or exhaust) opening configured to evacuate air from the cavity when stiffening and/or strengthening agent (e.g., joining compound) is applied. An exemplary evacuation opening may be positioned near to the portion of the shell that contacts a hollow structure.

Assembly

In certain embodiments, at least one connector, at least one hollow structure, and optionally, at least one functional element may be assembled together to form an assembly, such as a jig or fixture. An exemplary assembly may comprise a plurality of connectors and hollow structures, and at least one functional element. The assembly may require stiffness, strength, and accurate positioning of components. Stiffness and strength may be achieved by the use of a stiffness and/or strengthening agent (e.g., a joining compound) applied at least within the shell, around the plug, and inside the hollow structure.

When in use, assemblies are subject to forces. An assembly including at least one connector, hollow structure, and optionally, at least one functional element may be designed to balance the forces. For example, a fixture may have two connectors spaced near to one another in a specific region of the fixture, in order to balance forces and minimize torques that may be applied to the specific region.

In certain embodiments, the shell may be a mold for the connector. After filling the mold with a joining compound, the shell may be removed. The joining compound alone may be sufficient to support the assembly of hollow structures and/or functional elements.

What is claimed is:

1. A connector configured to couple to a hollow structure, wherein the connector comprises:
    a plug comprising:
        a first end configured to fit securely inside the hollow structure via an opening of the hollow structure and provide a secure seal between the first end and an inside wall of the hollow structure to prevent material introduced via the opening from passing the first end further into the hollow structure,
        a second end comprising a hook configured to engage with at least one portion of the hollow structure to secure the plug at the opening of the hollow structure, and
    a core piece extending from the first end to the second end; and
    a shell, separate from the plug, comprising:
        a wall surrounding a cavity,
        a first opening configured to provide a first access point to the cavity, wherein the first opening is configured to receive the plug coupled to the hollow structure,
        a second opening configured to provide a second access point to the cavity, wherein the second opening is configured to receive a second plug coupled to a second hollow structure, and
        a third opening configured to provide a third access point to the cavity, wherein the third access point leads to a continuous path extending through the cavity including extending to the first opening and the second opening, such that when the second plug coupled to the second hollow structure is received at the second opening and when the plug coupled to the hollow structure is received at the first opening, the plug and the second plug provide physical barriers of the continuous path.

2. The connector of claim 1, wherein the hollow structure is a partially-hollow structure.

3. The connector of claim 1, wherein the hollow structure is a tube.

4. The connector of claim 1, wherein the shell is attached to a functional element.

5. The connector of claim 4, wherein the functional element is selected from a sensor, a locator, a measuring device, a simulator, a connection point, a crane eye, a clamp, a wheel, a spring, an actuator, a load cell, a pneumatic probe, a laser, and a suction cup.

6. The connector of claim 1, wherein the core piece of the plug comprises a plurality of legs.

7. The connector of claim 1, wherein the hook is configured to protrude outside of the hollow structure.

8. The connector of claim 1, wherein the hook is configured to engage with a portion of the shell.

9. The connector of claim 8, wherein the portion of the shell is inside the cavity.

10. The connector of claim 1, wherein the first opening in the shell comprises a first surface that is configured to contact a portion of the hollow structure.

11. The connector of claim 10, wherein the first surface of the first opening of the shell is configured to contact a cross-sectional end of the hollow structure.

12. The connector of claim 1, wherein the shell further comprises a clamp having an open position configured to receive an end of the hollow structure and a closed position configured to fasten around the end of the hollow structure.

13. The connector of claim 12, wherein the clamp is reversibly attached to the shell.

14. The connector of claim 12, wherein the clamp and the shell form a one-piece structure.

15. The connector of claim 1, wherein the third opening in the shell is configured to receive a joining compound.

16. A method for using a connector configured to couple to a hollow structure, wherein the method comprises:
  inserting a plug into an opening of the hollow structure, the plug comprising:
    a first end configured to fit securely inside the hollow structure and provide a secure seal between the first end and an inside wall of the hollow structure to prevent material introduced via the opening of the hollow structure from passing the first end further into the hollow structure,
    a second end comprising a hook configured to engage with at least one portion of the hollow structure to secure the plug at the opening of the hollow structure, and
    a core piece extending from the first end to the second end;
  inserting the plug coupled to the hollow structure into a first opening of a shell, separate from the plug, the shell comprising:
    a wall surrounding a cavity,
    the first opening configured to provide a first access point to the cavity, and
    a second opening configured to provide a second access point to the cavity; and
  applying a joining compound into the shell through the second opening to fill the cavity and a portion inside the hollow structure, the plug preventing the joining compound from passing the first end further into the hollow structure.

17. The method of claim 16, wherein the joining compound is selected from an adhesive, a resin, an epoxy, and a composite.

18. The method of claim 16, further comprising:
  inserting a second plug into an opening of a second hollow structure; and
  inserting the second plug coupled to the second hollow structure into a third opening of the shell, wherein applying the joining compound further fills a portion inside the second hollow structure.

19. The method of claim 16, wherein the shell is attached to a functional element.

20. The method of claim 19, wherein the functional element is selected from a sensor, a locator, a measuring device, a simulator, a connection point, a crane eye, a clamp, a wheel, a spring, an actuator, a load cell, a pneumatic probe, a laser, and a suction cup.

* * * * *